(12) United States Patent
Kokado

(10) Patent No.: US 9,054,923 B2
(45) Date of Patent: Jun. 9, 2015

(54) COMMUNICATION TERMINAL, COMMUNICATION METHOD, AND PROGRAM

(75) Inventor: Takeshi Kokado, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 585 days.

(21) Appl. No.: 13/133,766

(22) PCT Filed: Dec. 24, 2009

(86) PCT No.: PCT/JP2009/007171
§ 371 (c)(1),
(2), (4) Date: Jun. 9, 2011

(87) PCT Pub. No.: WO2010/073656
PCT Pub. Date: Jul. 1, 2010

(65) Prior Publication Data
US 2011/0242971 A1 Oct. 6, 2011

(30) Foreign Application Priority Data
Dec. 26, 2008 (JP) .................................. 2008-334817

(51) Int. Cl.
H04B 7/14 (2006.01)
H04L 29/12 (2006.01)
(Continued)

(52) U.S. Cl.
CPC .... *H04L 29/12547* (2013.01); *H04L 29/12566* (2013.01); *H04L 45/22* (2013.01);
(Continued)

(58) Field of Classification Search
CPC ............ H04L 25/4908; H04L 12/2854; H04L 41/0896; H04L 45/00; H04L 67/20; H04L 45/22; H04L 45/28; H04L 67/26; H04L 67/2852; H04L 12/4641; H04L 29/12547; H04L 29/12566; H04L 41/0609; H04L 41/12; H04L 41/145
USPC ......... 370/252, 254, 315, 319, 341, 400, 401, 370/431, 474
See application file for complete search history.

(56) References Cited

U.S. PATENT DOCUMENTS

2005/0201342 A1* 9/2005 Wilkinson et al. ............ 370/338
2008/0244728 A1* 10/2008 Terasoma ....................... 726/14
2009/0303883 A1* 12/2009 Kucharczyk et al. ......... 370/241

FOREIGN PATENT DOCUMENTS

JP 62-248337 10/1987
JP 2008-225644 9/2008

OTHER PUBLICATIONS

International Search Report issued Feb. 9, 2010 in corresponding International Application No. PCT/JP2009/007171.
(Continued)

*Primary Examiner* — Yemane Mesfin
*Assistant Examiner* — Mon Cheri Davenport
(74) *Attorney, Agent, or Firm* — Wenderoth, Lind & Ponack, L.L.P.

(57) ABSTRACT

A communication terminal (6a, 6s, 6L) includes the following functional units. A relay communication establishment unit (621) establishes communication paths via respective relay devices (4a to 4N, 6p, 6q). A communication processing unit (624a) performs communication for pieces of divided data via the relay devices. A communication state monitor unit (622) changes a current set of the relay devices to a new set of relay devices so as to be used for the communication, based on estimation results of communication states.

15 Claims, 9 Drawing Sheets

(51) Int. Cl.
*H04L 29/08* (2006.01)
*H04L 12/707* (2013.01)
*H04L 12/703* (2013.01)

(52) U.S. Cl.
CPC ............ H04L 45/28 (2013.01); *H04L 61/2582* (2013.01); *H04L 61/2589* (2013.01); *H04L 67/2814* (2013.01); *H04L 67/2819* (2013.01); *H04L 67/288* (2013.01)

(56) References Cited

OTHER PUBLICATIONS

Kazuto Aso, "Wadai no Gijutsu no Koko ga Shiritai PC Base no Muryo IP Denwa Skype no Ugoki o Shiru", Nikkei Network, Dec. 22, 2004, No. 57, pp. 78-83 (with partial English translation).

J. Rosenberg, "Traversal Using Relays around NAT (TURN): Relay Extensions to Session Traversal Utilities for NAT (STUN) draft-ietf-behave-turn-09", Jul. 12, 2008, pp. 1-58.

* cited by examiner

COMMUNICATION TERMINAL, COMMUNICATION METHOD, AND PROGRAM

TECHNICAL FIELD

The present invention relates to communication terminals each of which is connected to local networks under different routers and is connectable to each other to perform data communication, and software for implementing such communication terminals.

BACKGROUND ART

In recent years, a connection method called "Peer to Peer (P2P)" connection has attracted attention. In the P2P connection, communication terminals connected to different networks are connected to each other, thereby sharing information and performing communication using video, audio, and the like.

However, communication terminals at general home are commonly connected using a Network Address Translator (NAT) function of a router.

Here, the NAT function is a function of translating a private address used within a local network (LAN) into a global address used in communication within a global network such as the Internet. An example of the NAT function is a narrow-defined NAT function of translating a private address to a global address on a one-to-one basis. In addition, a Network Address Port Translation (NAPT) function is also known. In the NAPT function, a pair of a private address and a port number is translated into a pair of a global address and a port number, so that the single global address enables a plurality of communication terminals connected under a router to share the single global address. Hereinafter, the narrow-defined NAT function and the NAPT function are referred to as a NAT function.

In order to connect communication terminals under different routers, it is necessary to correctly set NAT functions of both routers to which the communication terminals are connected.

One of methods for setting NAT function is known dynamic NAT setting. In the dynamic NAT setting, setting is automatically performed by a NAT function of a router, when, for example, a communication terminal connected to a local network transmits a packet to a server in a global network. More specifically, in the dynamic NAT setting, a NAT function of a router automatically assigns translated global address and port number, and automatically sets a translation rule including a pair of a local address and a port number of the communication terminal and a pair of the translated global address and port number.

Such dynamic NAT setting enables a user to perform communication without performing any specific NAT function setting, when, for example, a communication terminal connected to a local network is to be connected to a Web server on a global network.

With the above configuration, relay servers are provided on a global network, and communication terminals connected to different routers are thereby connected to the relay servers by using the dynamic NAT setting, so that the communication terminals are connected to one another via the relay servers. Thereby, as known, it is possible to realize communication without user's performing of any specific setting.

However, such a connection method using a relay server has a problem that traffic is concentrated on a relay server which causes bottleneck of processing capacity and processing band of the relay server. In order to solve the problem, (a) a communication terminal that is connected directly to a global network without any router, or (b) a communication terminal that sets NAT function to a router has a relay function to serve as a relay server. As a result, it is possible to increase the number of servers so as to distribute processing capacities and processing bands.

PRIOR ARTS

Non-Patent Reference

Non-Patent Reference 1: Traversal Using Relays around NAT (TURN): Relay Extensions to Session Traversal Utilities for NAT (STUN) draft-ietf-behave-turn-09

DISCLOSURE OF INVENTION

Problems that Invention is to Solve

However, in the method by which a communication terminal has a relay function to serve as a relay server, the communication terminal providing the relay function needs not only a capability of performing processing for the communication terminal itself but also a capability of performing relay processing. When performing the relay processing, the communication terminal needs to transmit received data to another terminal, which requires a capability of processing double-band data in the communication. The realization of the above processing causes a problem of a cost increase of communication terminals.

Furthermore, an access line connecting the communication terminal to the Internet is likely to have a limited band, likewise Asymmetric Digital Subscriber Line (ADSL). Therefore, there is a problem that the enlargement of a communication band on the relay of the relay function causes congestion which affects the entire local network to which the communication terminal providing the relay function is connected.

In order to address the above problems, an object of the present invention is to provide a communication terminal and a communication method, by which, when communication terminals are connected to each other to communicate by using relay processing of relay server(s), it is possible to prevent a large processing load on a communication terminal providing a relay function to serve as the relay server(s), and to reduce a communication band on the relay of each relay function.

Another object of the present invention is to increase a speed of data communication between communication terminals (for example, computers of users at general homes), and stabilize quality of the communication.

Means to Solve the Problems

In accordance with an aspect of the present invention for achieving the object, there is provided a communication terminal (communication terminal 6a, 6s, 6L, or the like) connected to a local network (local network 2a or 2s) to communicate with a partner communication terminal (communication terminal 6b, communication terminal 6t, or the like) via relay devices (relay servers 4a to 4N in FIG. 1, communication terminal 6p and communication terminal 6q in FIG. 8, and the like) each assigned with an address on a global network (for example, Internet 1 in FIG. 1), said communication terminal comprising: a relay communication establishment unit (relay communication establishment unit 621) configured to transmit a packet to an address of each of the relay devices to establish communication paths, so that each of the relay devices transmits another packet on a corresponding one of the communication paths to a source address of the packet transmitted from said communication terminal so as to transmit the another packet to said communication terminal (communication terminal 6a or the like); a communication unit (communication processing unit 624a, one of data transmission unit 624 and data receiving unit 625 in the communication processing unit 624a, or an entire unit (communication unit 62p or the like) including the communication processing unit 624a) configured to perform communication for pieces of divided data via the relay devices, the pieces of divided data being generated by dividing communication data into the pieces; and a communication state monitor unit (communication state monitor unit 622) configured to (i) monitor, for each of the relay devices, a communication state of the communication of a corresponding piece of the pieces of divided data transmitted via the corresponding relay device, and (ii) change a current set of the relay devices to a new set of relay devices at least one of which is not included in the current set so as to be used for the communication, based on estimation results of estimating the monitored communication state for the each of the relay devices.

With the above structure, it is possible to perform data communication at a high speed.

Further, the communication unit in the above structure may be considered to correspond to a communication processing unit 624a in FIG. 9. Furthermore, the communication unit in the above structure may be considered to correspond to all including the communication processing unit 624a, in other words, a communication unit 62p and the like in FIG. 2. The relay communication establishment unit in the above structure may be provided in the communication terminal according to the present embodiment, as a part of the communication unit (the communication unit 62p in FIG. 2). The communication state monitor unit in the above structure may perform the above-described change, based on, for example, a result of estimating each monitored communication state.

Furthermore, the communication unit may perform communication for at least a part of pieces of divided data, by sequentially using two or more relay devices. Furthermore, the communication unit may perform communication for at least a part of pieces of divided data, by using, in parallel, relay devices whose number is the same as the number of the part of the pieces of divided data. Here, the different pieces of divided data are communicated via different relay devices.

Furthermore, the communication unit performs the above-described change, based on, for example, a result of estimating the entire monitored communication states. Furthermore, more specifically, the communication state monitor unit controls at least one of the communication terminal and the partner communication terminal. The control is for changing the plurality of relay devices (hereinafter, referred to as "a plurality of using relay devices") via which the pieces of divided data are communicated. Here, the control for the communication terminal or the like means both of control for the entire communication terminal or the like and control only for a predetermined part of the communication terminal or the like. Here, the communication terminal is a "terminal". Therefore, the communication terminal may be, for example, a personal computer of a user at general home. Furthermore, the communication unit may communicate with the partner communication terminal to transmit the pieces of divided data in parallel, by, for example, transmitting them via the plurality of relay devices. Here, the pieces of divided data may be so-called packets, for example. For example, the communication unit divides communication data into a plurality of packets.

Furthermore, in practice, for example, if the result of estimating is better than a predetermined result, the communication state monitor unit does not perform the change and keeps the plurality of using relay devices as a current plurality of relay devices. Then, for example, in practice, if the result of estimating is equal to or worse than the predetermined result, the communication state monitor unit performs the above-described change to change the plurality of using relay devices so as to obtain as an estimation result better than the estimation result before the change. As a result, estimation (quality) of data communication can be kept to obtain a result of a communication state better than a predetermined result.

Effects of the Invention

The present invention can realize a communication terminal and a communication method, by which, when communication terminals are connected to each other to communicate by using relay processing of relay server(s), it is possible to prevent a large processing load on a device providing a relay function to serve as the relay server(s), and to reduce a communication band on the relay of each relay function.

In addition, the present invention can increase a speed of data communication between a communication terminal and its partner communication terminal, and stabilize quality of the communication.

BEST MODE FOR CARRYING OUT THE INVENTION

The embodiment of the present invention is described with reference to the drawings.

Figure 1:
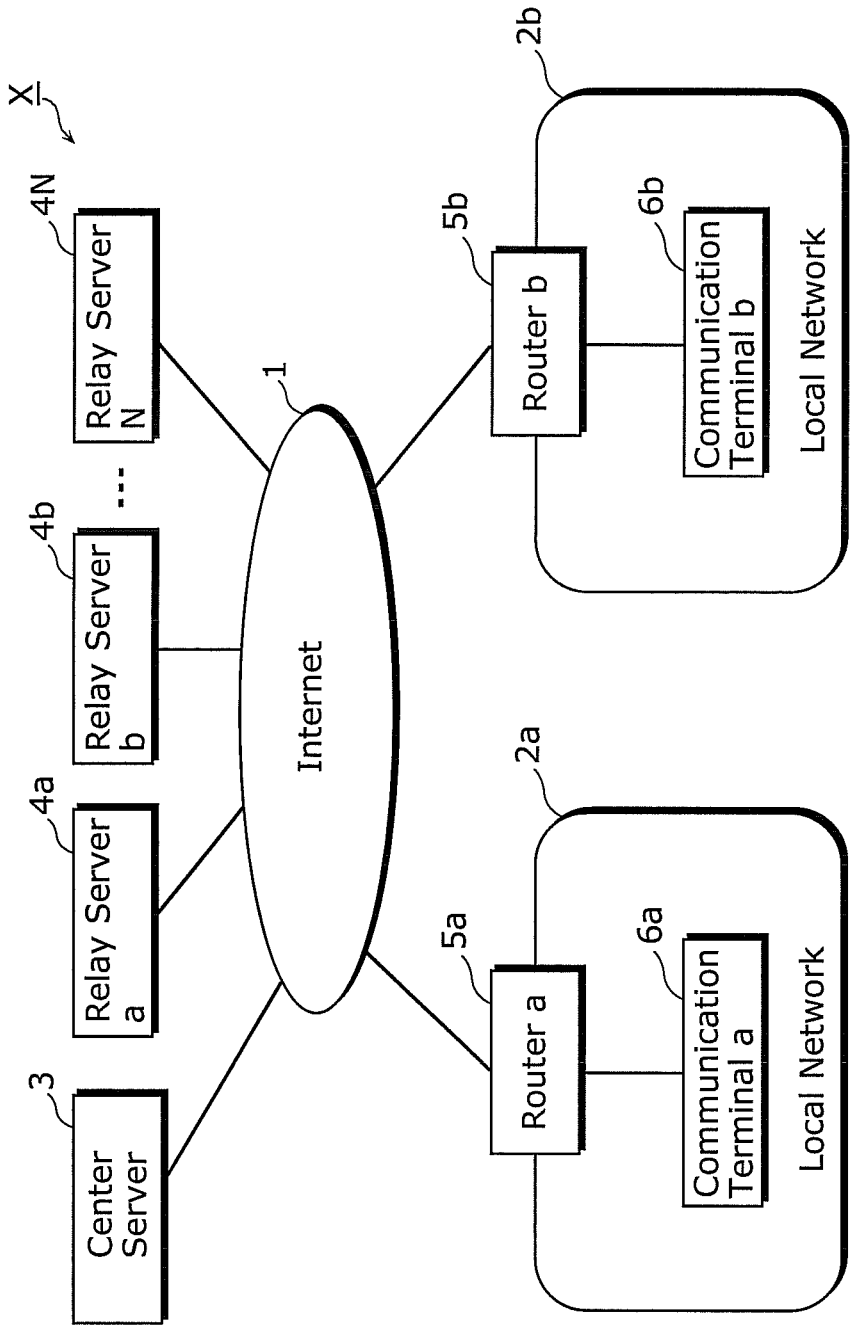
FIG. 1 is a diagram showing an example of a configuration of a network connecting communication terminals to one another according to an embodiment of the present invention.

FIG. 1 is a block diagram showing a network configuration for communication terminals according to the embodiment.

A system X includes a center server 3, a local network 2a, a local network 2b, and N relay servers (relay servers 4a to 4N). Here, N is an integer of 2 or more.

The local network 2a includes a router 5a and a communication terminal 6a.

The local network 2b includes a router 5b and a communication terminal 6b.

The following describes in detail the situation where, among communication terminals included in the system X, one communication terminal (the communication terminal 6a, in this example) starts communication between the communication terminal 6a and the communication terminal 6b. Hereinafter, for the sake of explanation convenience, the communication terminal 6a is referred to as a transmitting communication terminal 6a, and the communication terminal 6b is referred to as a receiving communication terminal 6b.

In the system X, the center server 3, the relay servers 4a to 4N, and the routers 5a and 5b are connected to one another via the Internet 1 that is a global network. Each of the routers 5a and 5b has NAT function. Thereby, the communication terminal 6a is connected to the local network 2a under the router 5a, and the communication terminal 6b is connected to the local network 2b under the router 5b.

In the embodiment, each of the communication terminals 6a and 6b, which are connected to the routers 5a and 5b, respectively, is connected to the relay servers 4a to 4N via partial communication paths, so that each communication terminal performs communication via the plurality of relay servers. Hereinafter, each of the partial communication paths connecting the transmitting communication terminal 6a to the relay server is referred to as a transmitting partial communication path. Each of the partial communication paths connecting the receiving communication terminal 6b to the relay server is referred to as a receiving partial communication path. A single relay communication path via a relay server includes: a transmitting partial communication path connected from the transmitting communication terminal 6a to the relay server; and a receiving partial communication path connected from the receiving communication terminal 6b to the relay server. In other words, the transmitting partial communication path is a part between the transmitting communication terminal 6a and the relay server, in the relay communication path. The receiving partial communication path is a part between the receiving communication terminal 6b and the relay server, in the relay communication path. Then, more specifically, the transmitting communication terminal 6a establishes such a transmitting partial communication path to each of k selected relay servers (2≤k≤N) that are determined based on relay server information that will be described in detail later, and the receiving communication terminal 6b establishes such a receiving partial communication path to each of the k selected relay servers. Then, the communication terminals 6a and 6b communicate with each other via the relay communication paths connected from the selected relay servers. Thereby, the communication terminals 6a and 6b perform relatively higher-speed communication, such as communication at k-fold speed, in comparison to, for example, communication using only one relay server.

Here, the center server 3, which is connected to the communication terminals 6a and 6b to be communicable at any time with the communication terminals, has a signaling function of transmitting and receiving control messages for connecting and disconnecting between the communication terminals. In addition, the center server 3 has a function of managing relay server information. With the relay server information management function, the center server 3 manages the relay server information that includes pieces of address information of the respective relay servers 4a to 4N, and provides the relay server information to the communication terminals 6a and 6b.

Hereinafter, an address refers to information for identifying a communication destination in a network. For example, an address may be an IP address, a set of an IP address and a port number, or the like. The address information refers to information including such an address.

The relay server information is information for identifying a part or all of the relay servers 4a to 4N shown in FIG. 1. It should be noted that the relay server information may be information for identifying a predetermined value of a correspondence relationship that the transmitting communication terminal 6a, for example, has. Here, the correspondence relationship indicates a value determined by the relay server information in association with two or more pieces of relay server information. Then, the value determination allows the relay server information to be used to identify each of selected relay servers indicated by the correspondence relationship. The communication terminal has a function of identifying each of relay servers corresponding to the value, based on, for example, the value.

When data is to be exchanged between the communication terminal 6a and the communication terminal 6b, each of the relay servers 4a to 4N provides a relay function of being temporarily connected to the communication terminals 6a and 6b so as to relay the data between the communication terminals.

The router 5a has a NAT function. The router 5a causes the local network 2a and the Internet 1 to be connectable to each other. The communication terminal 6a communicates with the center server 3 and the relay servers 4a to 4N via the router 5a in the local network 2a, thereby exchanging data with another communication terminal. Likewise, the router 5b has a NAT function. The router 5b causes the local network 2a and the Internet 1 to be connectable to each other. The communication terminal 6b communicates with the center server 3 and the relay servers 4a to 4N via the router 5b in the local network 2a, thereby exchanging data with another communication terminal.

As described above, each of the routers 5a and 5b has NAT function. Thereby, using the dynamic NAT setting function of the local network (the local network 2a or the local network 2b) including a corresponding one of the communication terminals 6a and 6b, each of the communication terminals 6a and 6b can establish communication paths to the external apparatuses (the center server 3, the relay servers 4a to 4N) outside the local network. On the other hand, the external apparatuses cannot establish any connection path to the communication terminals (the communication terminal 6a, the communication terminal 6b) included in the respective local networks.

Figure 2:
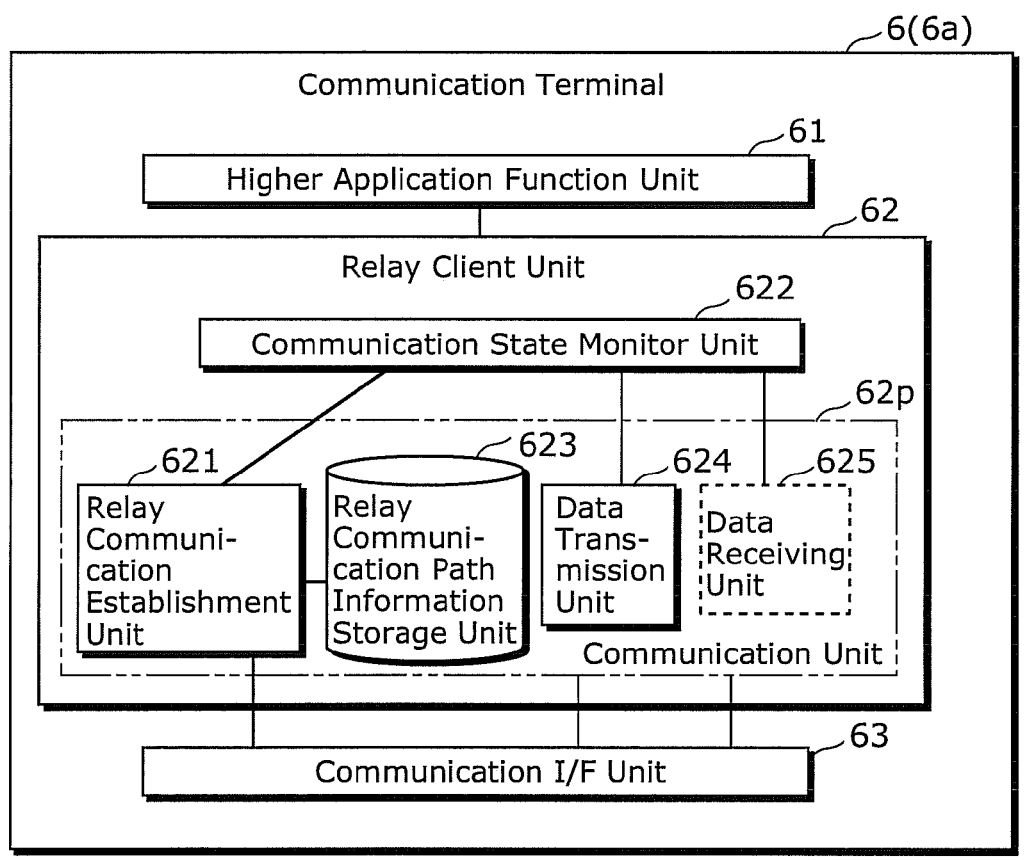
FIG. 2 is a block diagram showing an example of a functional structure of a communication terminal according to the embodiment of the present invention.

FIG. 2 is a diagram showing an example of a basic structure of a communication terminal 6.

The communication terminals (the communication terminal 6a, the communication terminal 6b, and others) included in the system X have common functions that are identical among the communication terminals. The communication terminal 6 is an example of the communication terminals (the communication terminal 6a, the communication terminal 6b, and others) included in the system X. The communication terminal 6 is, for example, the communication terminal 6a. In FIG. 2, the communication terminal 6 includes a higher application function unit 61, a relay client unit (relay communication client unit) 62, and a communication I/F unit 63.

It should be noted that the communication terminal 6 may be, for example, a computer including a Central Processing Unit (CPU), a Random Access Memory (RAM), a Read Only Memory (ROM), and the like. The units such as the relay client unit 62 included in the communication terminal 6 may be functional blocks having functions implemented by executing a program by the computer.

The higher application function unit 61 provides an application function of the communication terminal 6. The higher application function unit 61 exchanges communication data with a partner communication terminal that is a communication terminal communicating with the communication terminal 6. Thereby, the higher application function unit 61 provides the user with an interface (I/F), by using the exchanged data.

The relay client unit 62 included in the transmitting communication terminal 6a establishes relay communication paths between the transmitting communication terminal 6a and a partner communication terminal (the receiving communication terminal 6b), by using a plurality of relay servers (selected relay servers) identified by the above-described relay server information. By the plurality of relay communication paths, the relay client unit 62 realizes relay communication. More specifically, the relay client unit 62 establishes the above-described partial communication path between each of the selected relay servers and the transmitting communication terminal 6a. In other words, the relay client unit 62 connects the above-described transmitting partial communication path to each of the selected relay servers. In addition, the relay client unit 62 issues a connection request (Step S33 in FIG. 3), which will be described in detail later, to the receiving communication terminal 6b, so as to request the receiving communication terminal 6b to establish a receiving partial communication path with each of the selected relay servers. Here, the connection request is issued via the center server 3, which will be described in detail later. Thereby, the relay client unit 62 in the transmitting communication terminal 6a establishes k relay communication paths.

The communication I/F unit 63 provides an interface function of connecting the communication terminal 6 to a network. The relay client unit 62 is connected to the network via the communication I/F unit 63.

Moreover, in more detail, the relay client unit 62 includes a relay communication establishment unit 621, a communication state monitor unit 622, a relay communication path information storage unit 623, a data transmission unit 624, and a data receiving unit 625.

The relay communication establishment unit 621 obtains relay server information from the center server 3, and establishes, by using the obtained relay server information, a relay communication path for relay communication between each of the plurality of relay servers and the transmitting communication terminal 6a.

In addition, the relay communication establishment unit 621 obtains instructions from the communication state monitor unit 622, which will be described in detail later. More specifically, firstly, the relay communication establishment unit 621 receives a removal instruction for instructing removal of an existing relay communication path which the relay communication establishment unit 621 has established. Secondly, the relay communication establishment unit 621 receives a new establishment instruction for instructing establishment of a new relay communication path. Thirdly, the relay communication establishment unit 621 receives an ambi instruction for instructing both the removal of the existing relay communication path and the establishment of a new alternate relay communication path. Then, when the removal instruction is received, the relay communication establishment unit 621 removes the relay communication path designated by the received removal instruction. On the other hand, when the new establishment instruction is received, the relay communication establishment unit 621 establishes a new relay communication path for a relay server designated by the received new establishment instruction. Moreover, when the ambi instruction is received, the relay communication establishment unit 621 removes the relay communication path designated by the receive ambi instruction, and establishes a new relay communication path designated by the ambi instruction.

The communication state monitor unit 622 monitors and estimates a communication state (a communication band, a transmission delay, a packet loss rate, and the like) of relay communication path(s) between the partner communication terminal 6b and the transmitting communication terminal 6a. Then, based on the estimation results, the communication state monitor unit 622 instructs, to the relay communication establishment unit 621, removal of a relay communication path, establishment of a new relay communication path, or both the removal of the existing relay communication path and the establishment of the new alternate relay communication path. In other words, based on the estimation results, the communication state monitor unit 622 transmits the above-described removal instruction, the new establishment instruction, or the ambi instruction to the relay communication establishment unit 621, so that the relay communication establishment unit 621 receives the transmitted instruction. Thereby, the communication state monitor unit 622 causes the relay communication establishment unit 621 to perform the above-described processing corresponding to the received instruction. The instructions from the communication state monitor unit 622 will be described in more detail later.

The relay communication path information storage unit 623 stores and manages (a) the relay server information which the relay communication establishment unit 621 obtains from the center server 3, and (b) pieces of relay communication path information of the respective relay communication paths which have been established by the relay communication establishment unit 621 for the relay servers. Here, the latter information, namely, each of the relay communication paths, includes: identification (ID) for uniquely identifying a corresponding relay communication path; and address information (an IP address and a port number) of a relay server relaying on the relay communication path.

The data transmission unit 624 divides transmission data (to-be-transmitted data) provided from the higher application function unit 61 into packets each having a predetermined size, and then transmits the resulting packets on the plurality of relay communication paths established by the relay communication establishment unit 621. More specifically, for example, the data transmission unit 624 assigns each of the packets to one of packet groups each corresponding to a corresponding one of k relay communication paths. Then, the data transmission unit 624 transmits a target packet assigned in a packet group, by using a relay communication path corresponding to the packet group. Thereby, the data transmission unit 624 transmits the packets in the packet groups on the plurality of relay communication paths, for example, in parallel. Thereby, the data transmission unit 624 communicates (transmits) packets of transmission data (to-be-transmitted data) at a relatively higher speed, for example, at k-fold speed (where k is the number of relay communication paths), in comparison to, for example, communication using only one relay communication path.

The "pieces of divided data" in the appended claims are, for example, the "packets" in the embodiment.

Here, the data transmission unit 624 assigns, to each of the packets, a sequence number representing a position in correct order, so that the partner communication terminal 6b receiving the packets via the plurality of relay communication paths can process the packets in the correct order to reconstruct original data.

The data receiving unit 625 of the partner communication terminal 6b sorts the packets received via the plurality of relay communication paths by using the sequence numbers or the like included in the packets, thereby reconstructs the transmission data that has been transmitted from the higher application function unit of the transmission source (the communication terminal 6a), and then provides the reconstructed data to the higher application function unit of the partner communication terminal 6b.

The following describes the processing performed by the communication terminal having the above structure in more detail with reference to FIGS. 3 to 6.

(Connection Sequence)

Figure 3:
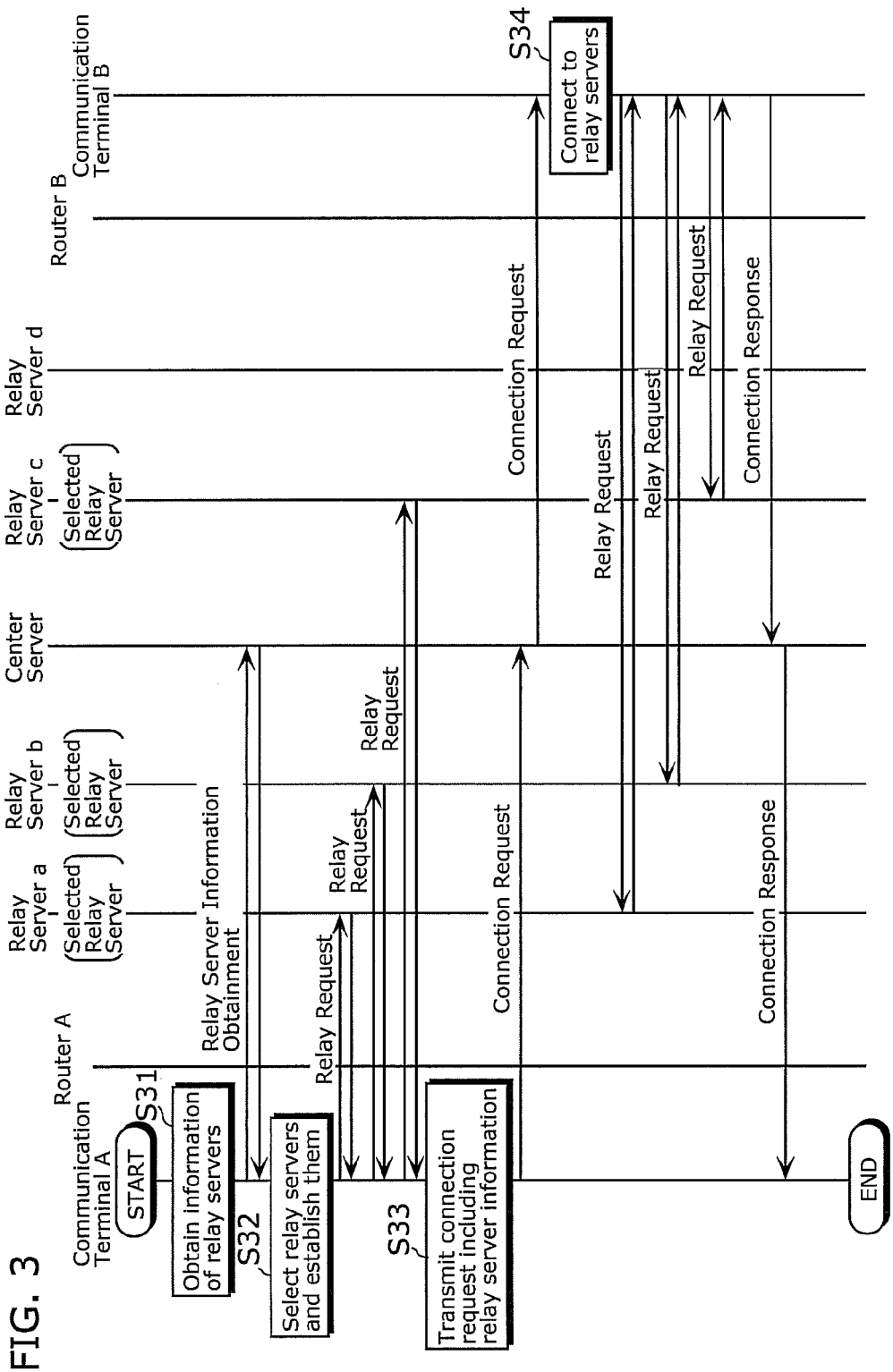
FIG. 3 is a sequence diagram showing an example of a flow of connecting communication terminals according to the embodiment of the present invention.

FIG. 3 is a diagram showing an example of a sequence of connection between communication terminals.

At S31, firstly, by using the relay communication establishment unit 621, the transmitting communication terminal 6a obtains latest relay server information from the center server 3.

Here, each of the communication terminals 6a and 6b previously establishes a communication path to the center server 3 immediately after activation of each of the communication terminals 6a and 6b, so that the relay server information can be received at any time from the center server 3. Here, as described earlier, if the communication terminal 6a or 6b connected to a local network establishes a communication path to the center server 3 connected to the Internet 1, the dynamic NAT setting of the router allows the communication terminal to establish a communication path without any other specific setting (establishment).

Here, at S31, the center server 3 selects relay server information to be provided to the communication terminal 6a in consideration of current load state of each of the relay servers 4a to 4N. As a result, it is possible to smooth loads among the relay servers.

At S32, based on the relay server information obtained from the center server 3, the relay client unit 62 of the transmitting communication terminal 6a selects relay servers (selected relay servers) to be used in relay communication. Then, the relay client unit 62 transmits a relay request to each of the selected relay servers (relay servers 4a to 4c: selection relay servers). Here, pieces of address information of the relay servers are retrieved from the relay server information. The relay server information includes pieces of address information of the relay servers determined in the relay server information.

Then, at S32, each of the selected relay servers (the relay servers 4a to 4c) receiving the relay request performs setting (establishment) for relay communication, in the selected relay server itself. Then, in response to the relay request, each selected relay server transmits, to the transmitting communication terminal 6a, relay communication path information including (a) ID for uniquely identifying a relay communication path between the transmitting communication terminal 6a and the selected relay server and (b) address information (an IP address and a port number) of the selected relay server to be used in the relay communication.

It should be noted that at least one of the relay servers 4a to 4N may include, in more detail, two devices that are a control device and a data communication device. The data communication device may perform relay for communication of data (user data) that is transmitted on a relay communication path of a relay server. On the other hand, the control device may control the communication of the user data which is performed by the data communication device. The address information included in the above-described relay server information may be used to identify an address of the control device. Then, at S32, the relay client unit 62 may cause the control device of the selected relay server to receive the above-described relay request. Then, at S32, when the control device receives the relay request, in response to the relay request, the control device may transmit, to the communication terminal 6a, relay communication path information including address information for identifying the data communication device included in the relay server that includes the control device. The relay communication path information may include address information of the control device included in the relay server that includes the data communication device, in addition to the address information of the data communication device.

Then, at S32, the relay client unit 62 receiving the above-described pieces of relay communication path information from the respective selected relay servers stores the received pieces of relay communication path information into the relay communication path information storage unit 623. Then, based on the pieces of address information in the respective pieces of relay communication path information received in response to the request, the relay client unit 62 establishes respective relay communication paths (the above-described transmitting partial communication paths of the relay communication paths), by, for example, accessing the above-described data communication devices indicated by the pieces of address information. It should be noted that the communication connection described in the embodiment is connection from the communication terminal 6a connected to the local network 2a to the relay server(s), so that the dynamic NAT setting of the router allows the communication terminal 6a to establish a communication path without any other specific setting (establishment).

At S33, next, the relay client unit 62 requests the center server 3 to transmit a connection request to a partner communication terminal (the receiving communication terminal 6b). The connection request in the connection request transmission described in the embodiment includes pieces of relay communication path information of the relay communication paths which have been established at S32 by the transmitting communication terminal 6a. The connection request includes, for example, (a) the pieces of address information of the respective selected relay servers and (b) pieces of ID of the respective relay communication paths which are indicated by the pieces of address information. More specifically, for example, the connection request may include (a) pieces of address information of the data communication devices of the respective selected relay servers and (b) pieces of address information of the control devices of the respective selected relay servers. However, the connection request does not necessarily include the pieces of address information of the data communication devices.

At S32, the receiving communication terminal 6b receiving the connection request from the center server 3 retrieves the pieces of relay communication path information from the received connection request. Then, the receiving communication terminal 6b transmits a relay request message including IDs for uniquely identifying the relay communication paths, to the relay servers (the relay servers 4a to 4c, the control devices of the respective relay servers) which are connected to the transmitting communication terminal 6a via the respective relay communication paths (transmitting partial communication paths of the respective relay communication paths). The transmitted IDs are IDs included in the retrieved pieces of relay communication path information. Each of the IDs is used to uniquely identify a relay communication path among relay communication paths connected to a relay server.

Each relay server (the control device of the relay server) receiving the request identifies a relay communication path based on the ID included in the relay request message transmitted at S34. Then, in response to the request, each relay server transmits, to the receiving communication terminal 6b, address information (an IP address and a port number) of the relay server (the data communication device of the relay server) to be used in relay communication.

Then, at S34, next, the relay client unit 62 of the receiving communication terminal 6b, which receives responses from the respective selected relay servers, stores pieces of relay communication path information included in the respective received responses, and establishes the above-described receiving partial communication paths to the respective relay servers (the data communication devices of the relay servers) indicated by the pieces of address information included in the respective received relay communication path information.

Then, at S34, after completion of establishing communication paths (receiving partial communication paths) to all of the relay servers, the receiving communication terminal 6b transmits a connection response message to the transmitting communication terminal 6a via the center server 3.

Here, likewise the transmitting partial communication paths of the transmitting communication terminal 6a side, the dynamic NAT setting of the router 5b causes the receiving communication terminal 6b to establish the receiving partial communication paths to the respective selected relay servers for the receiving communication terminal 6b, without any specific setting (establishment).

(Packet Loss Retransmission Sequence)

Figure 4:
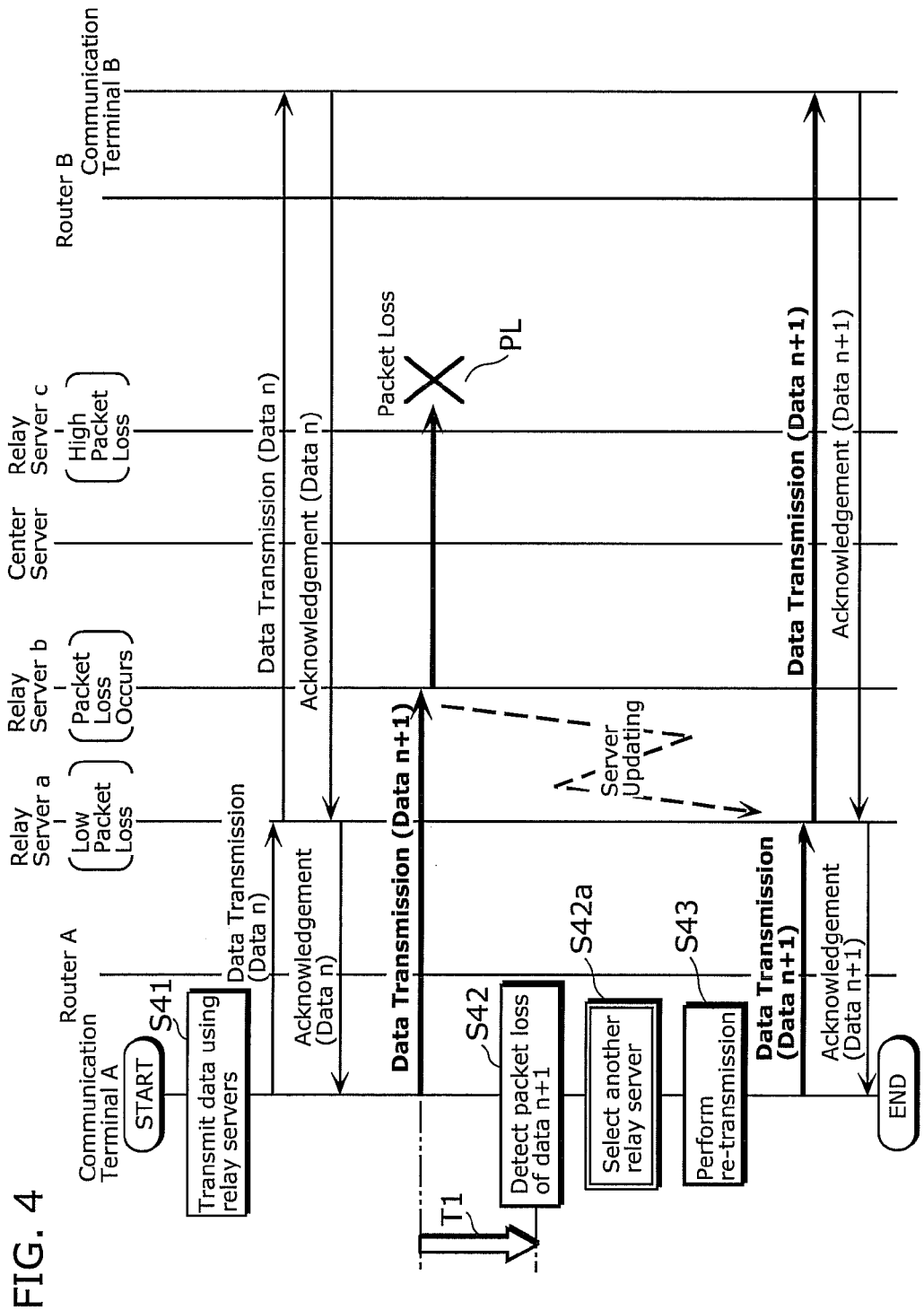
FIG. 4 is a sequence diagram showing an example of a flow of retransmission between communication terminals according to the embodiment of the present invention.

FIG. 4 is a diagram showing an example of a retransmission sequence in the situation where packet loss occurs.

At S41, the relay client unit 62 of the transmitting communication terminal 6a transmits pieces of packet data by a plurality of relay communication paths. The pieces of packet data have been generated by dividing transmission data that has been requested by the higher application function unit 61 to be transmitted. In the example of FIG. 4, the relay communication paths used in the transmission are: a relay communication path of the relay server 4a (hereinafter, referred to also as a "relay server a"); a relay communication path of the relay server 4b (hereinafter, referred to also as a "relay server b"); and a relay communication path of the relay server 4c (hereinafter, referred to also as a "relay server c").

Then, according to the step S41, when the partner communication terminal (the receiving communication terminal 6b) receives packet data, the relay client unit 62 of the receiving communication terminal 6b transmits an acknowledgement message on the relay communication paths on which the packet data has been received, to the communication terminal (the transmitting communication terminal 6a) that has transmitted the packet data. FIG. 4 shows the transmission of the acknowledgement message on the relay communication path of the relay server a.

S42, the relay client unit 62 of the transmitting communication terminal 6a that has transmitted the packet data measures a time from the packet transmission at S41 to reception of the acknowledgement message in response to the packet transmission at S41, thereby generating information indicating a transmission delay of each of the relay communication path.

At S42, the relay client unit 62 detects a packet loss PL (refer to FIG. 4) by determining that an acknowledgement message has not yet been received in response to the packet transmission since elapse of a predetermined time (a predetermined time T1 in FIG. 4) from the packet transmission. FIG. 4 shows a packet loss in packet transmission on the relay communication path of the relay server b, as an example of the packet loss PL.

At S42a, the relay client unit 62 of the transmitting communication terminal 6a, which has transmitted the packet and detected the packet loss at S42, selects a relay communication path having a low packet loss rate and a small transmission delay.

Here, more specifically, for example, the relay client unit 62 selects a relay communication path from the relay communication paths (the relay communication paths of the relay servers a and c) except the relay communication path with the packet loss (the relay communication path of the relay server b), among the relay communication paths (for example, the relay communication paths of the relay servers a, b, and c) which have been established by the transmitting communication terminal 6a. Then, for example, from these relay communication paths, the relay client unit 62 selects a relay communication path having the lowest packet loss rate (the relay communication path of the relay server a).

Or, for example, the transmitting communication terminal 6a selects a relay communication path having quality higher than a predetermined threshold value. Here, the quality may be, for example, the above-described packet loss rate or a transmission delay. A packet loss rate having a smaller value has higher quality. A transmission delay having a shorter delay time has higher quality. Here, the threshold value may be, for example, quality of a predetermined relay communication path among the above-described relay communication paths. Then, for example, the predetermined relay communication path is a relay communication path having the second highest quality value among the above-described relay communication paths. In this case, the relay client unit 62 is assumed to select a relay communication path having the highest quality value among the above-described relay communication paths.

Then, at S43, the relay client unit 62 of the transmitting communication terminal 6a retransmits the loss packet.

Here, the relay client unit 62 selects a relay communication path with a less packet loss at S42. As a result, a probability of occurrence of a further packet loss can be reduced. Moreover, if a relay communication path with a small transmission delay is selected, it is possible to transmit the loss packet to the partner soon. As a result, it is possible to reduce a time required for the retransmission.

After the transmission from the transmitting communication terminal 6a at S41, the relay server selected at S42a performs transmission at S43 according to a packet loss resulting from the transmission of S41. Thereby, the relay server performing transmission is changed from the relay server (the relay server b) performing the first transmission to the relay server (the relay server a) performing the second transmission. In FIG. 4, the broken-line arrow shows merely the change between the relay servers, and does not show a flow of data in the system X.

(Relay Communication Path Change Sequence)

Figure 5:
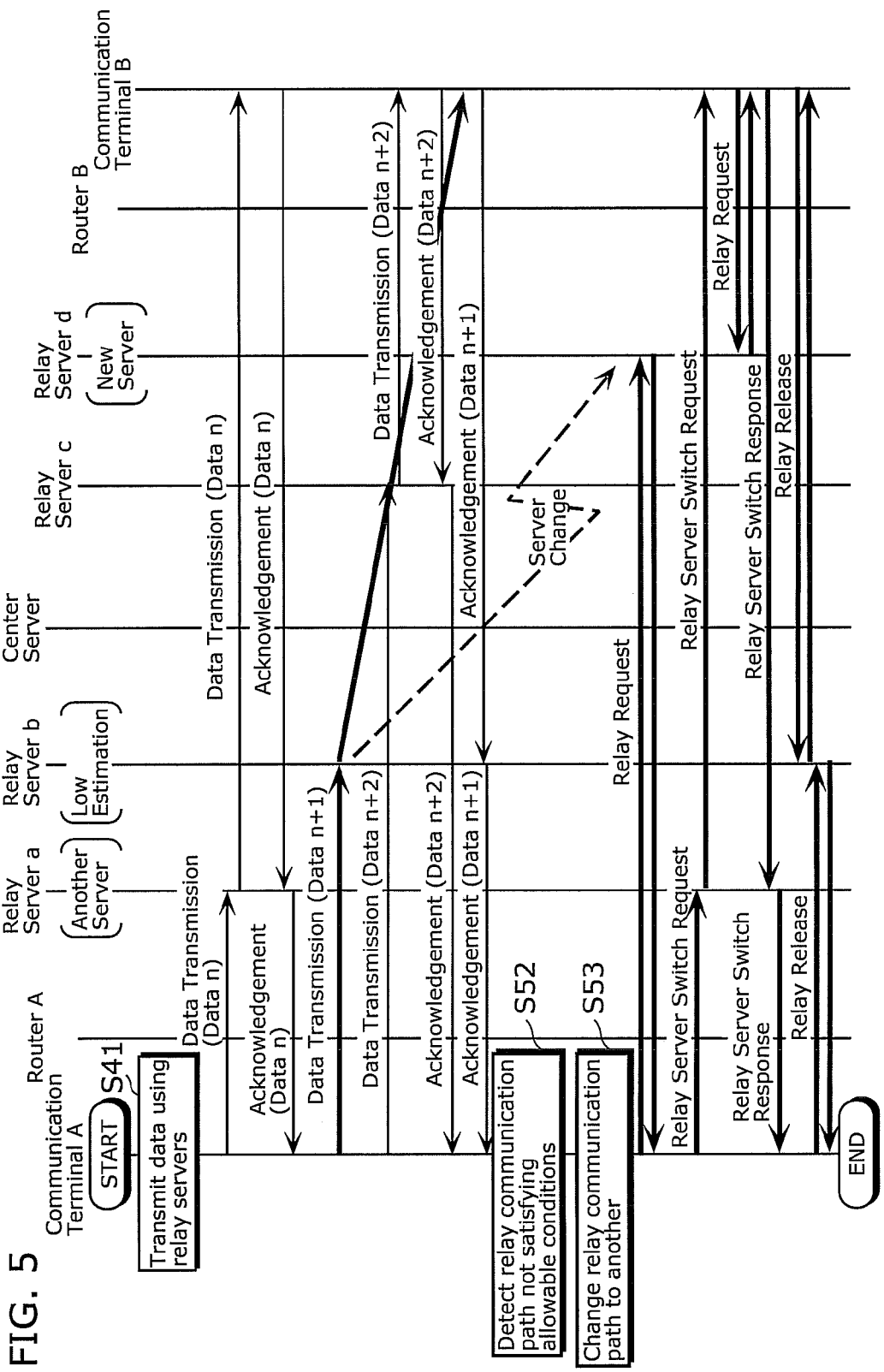
FIG. 5 is a sequence diagram showing an example of a flow of changing (switching) a relay communication path between communication terminals according to the embodiment of the present invention.

FIG. 5 shows an example of a sequence of changing (switching) between relay communication paths.

The step S51 of transmitting data on the plurality of relay communication paths via the relay servers is the same as step S41 in FIG. 4, so that the step is not described again below. The sequence of FIG. 5 differs from the sequence of FIG. 4 in that a packet loss does not occur but a transmission delay on the relay communication path via the relay server b is extremely larger than a transmission delay of any other relay communication paths. Here, the extremely large transmission delay means that the transmission delay is quite larger than a normal transmission delay, and also that the transmission delay is quite larger than a transmission delay smaller than the normal transmission delay.

The relay client unit 62 of the transmitting communication terminal 6a that transmits packets always obtains and estimates information of a transmission delay of each of the relay communication paths. Thereby, the relay client unit 62 detects that statistical information such as an average and a variation of a transmission delay of the relay communication path via the relay server b, or a value of the largest transmission delay (a value to be estimated) does not satisfy a predetermined criterion.

At S52, as a result of the detection, the relay client unit 62 of the transmitting communication terminal 6a that transmits packets determines that the relay communication path via the relay server b is not suitable. In the description, the relay server b is an example of a relay server that is determined as unsuitable by the relay client unit 62.

Next, at S53, the relay client unit 62 of the transmitting communication terminal 6a that transmits packets switches (changes) between relay communication paths as described below. More specifically, the relay client unit 62 of the transmitting communication terminal 6a selects a new relay server (the relay server 4d (hereinafter, referred to also as a "relay server d")) based on the relay server information that has been obtained from the center server 3. Then, the relay client unit 62 transmits a relay request message to the selected new relay server.

Here, at S52, when, for example, it is determined that a relay communication path is not suitable, the relay client unit 62 may obtain the relay server information for identifying a relay server, from the center server 3. Then, at S53, the relay client unit 62 may select the relay server identified by the relay server information obtained at S52. The relay server information obtained at S31 in FIG. 3 may include new relay server information for identifying a new relay server to be selected at S53 in FIG. 5. Then, at S53 in FIG. 5, the relay client unit 62 may select the relay server identified by the new relay server information included in the relay server information obtained at S31.

Here, in the example of FIG. 5, the relay server information that is, for example, obtained at S52 includes address information of the relay server d, as address information of the new relay server. Then, at S53, the relay server d is selected. Therefore, in the example of FIG. 5, at S53, the relay request message is transmitted to the relay server d, and the relay server to be used is switched (changed) from the relay server b to the relay server d. In FIG. 5, the switch is shown by a broken-line arrow. The broken-line arrow in FIG. 5 shows merely the switch between the relay servers, and does not show a flow of data in the system X.

Then, at S53, when the relay request message is received, the relay server d (the new relay server) transmits a response message including relay communication path information of the relay server d to the relay client unit 62.

Then, at S53, when the relay client unit 62 of the transmitting communication terminal 6a receives the relay communication path information from the relay server d, the relay client unit 62 stores the received relay communication path information into the relay communication path information storage unit 623 or the like, and establishes a relay communication path to the address indicated in the received relay communication path information.

Then, at S53, to the partner communication terminal 6b via a relay communication path (for example, the relay communication path of the relay server a) rather than the relay communication path determined as unsuitable, the relay client unit 62 transmits: (a) the relay communication path information of the relay communication path (the relay communication path of the relay server b) determined as unsuitable at S52; and (b) a relay server switch request message including the relay communication path information of the newly-established relay communication path (the relay communication path of the relay server d). In other words, at S53, the relay client unit 62 of the transmitting communication terminal 6a transmits the relay server switch request message to the receiving communication terminal 6b on a certain relay communication path (the relay communication path of the relay server a) of the relay communication paths (the relay communication paths of the relay servers a and c) except the relay communication path (the relay communication path of the relay server b) determined as unsuitable, among the relay communication paths (for example, the relay communication paths of the relay servers a, b, and c) which have been established.

Then, at S53, when the relay client unit 62 of the communication terminal 6b receives the relay server switch request message on the certain relay communication path (the relay communication path of the relay server a), the relay client unit 62 transmits a relay request to the relay server d (the control device of the relay server d) based on the relay communication path information of the relay communication path (the relay communication path of the relay server d) to be newly established. Then, the relay client unit 62 of the receiving communication terminal 6b establishes a relay communication path (a receiving partial communication path included in the relay communication path) to the newly-established relay server (the relay server d) based on the relay communication path information received from the relay server d as a response. After that, the relay client unit 62 transmits a relay server switch response message to the transmitting communication terminal 6a. Here, the relay client unit 62 of the receiving communication terminal 6b transmits the relay server switch response message on the certain relay communication path (the relay communication path of the relay server a) as shown in FIG. 5, for example. For example, the transmission may be performed on another communication path having quality higher than quality of the certain relay communication path.

At the same time, at S53, to the relay server b that provides the relay communication path determined as unsuitable, the receiving communication terminal 6b transmits a relay release message in order to release the relay communication path (the receiving partial communication path in the relay communication path).

Likewise, at S53, the relay client unit 62 of the communication terminal 6a, which receives the relay server switch response message, transmits a relay release message to the relay server b determined as unsuitable, in order to release the relay communication path (the transmitting partial communication path in the relay communication path).

(Disconnection Sequence)

Figure 6:
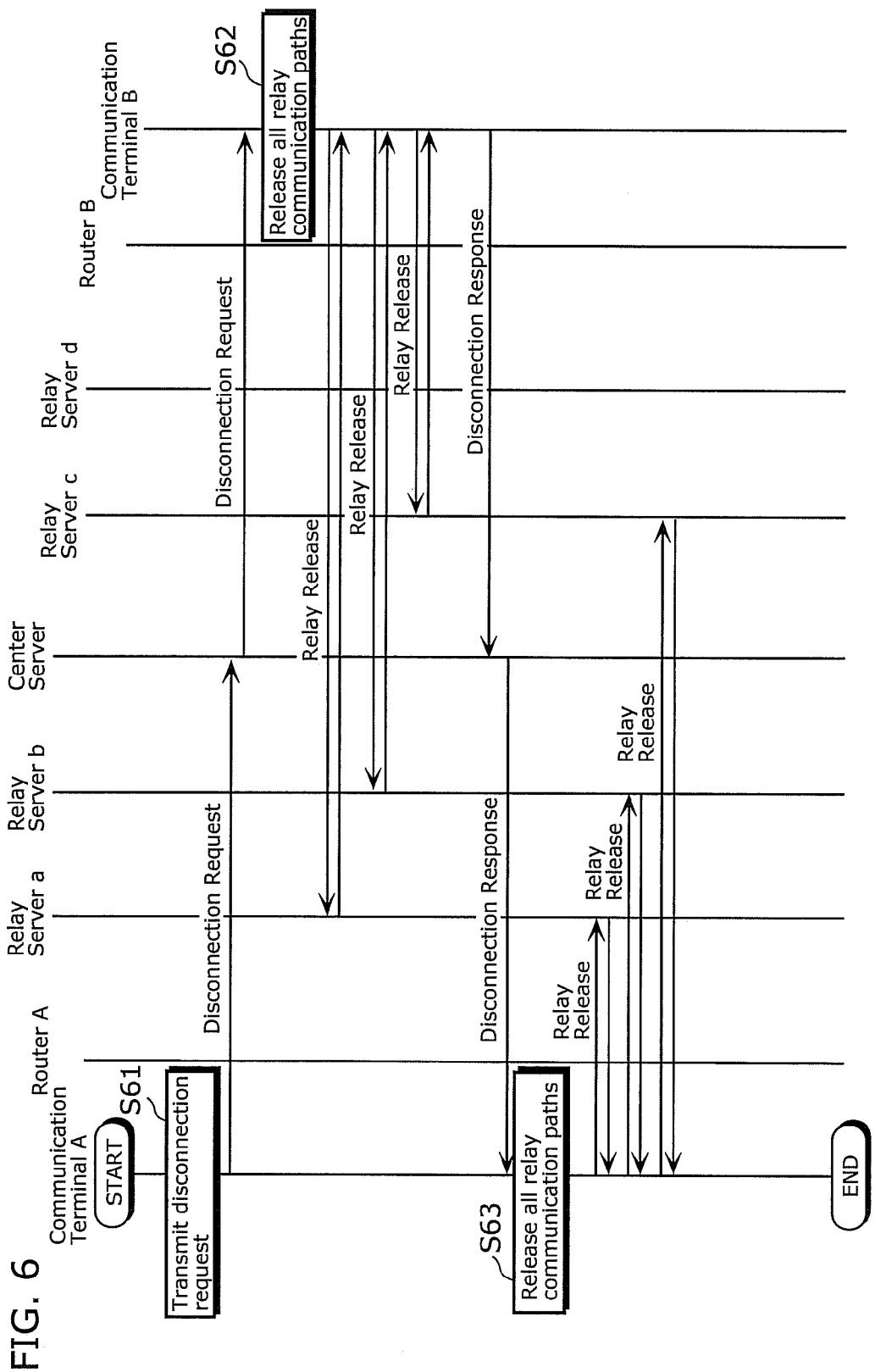
FIG. 6 is a sequence diagram showing an example of a flow of disconnection for communication terminals according to the embodiment of the present invention.

FIG. 6 shows an example of a disconnection sequence.

At S61, in the transmitting communication terminal 6a side, when disconnection is instructed from the higher application function unit 61, the relay client unit 62 transmits a disconnection request message to the partner communication terminal 6b via the center server 3.

At S62, in the receiving communication terminal 6b side, when the disconnection request message is received, the relay client unit 62 of the receiving communication terminal 6b transmits a relay release message to the relay servers of the all connecting relay communication paths in order to release the relay communication paths, and then transmits a disconnection response message to the transmitting communication terminal 6a.

Likewise, at S63, when the communication terminal 6a receives the disconnection response message, the relay client unit 62 of the communication terminal 6a transmits a relay release message to the relay servers of the all relay communication paths connecting to the transmitting communication terminal 6a in order to release the relay communication paths, and then completes the communication between the communication terminals.

(Configuration for Communication Terminal with Relay Server Function)

It has been described above that there are relay servers 4a to 4N dedicated to be connected to the Internet 1. On the other hand, the following describes a configuration where a communication terminal has a relay server function with reference to FIGS. 7 and 8.

Figure 7:
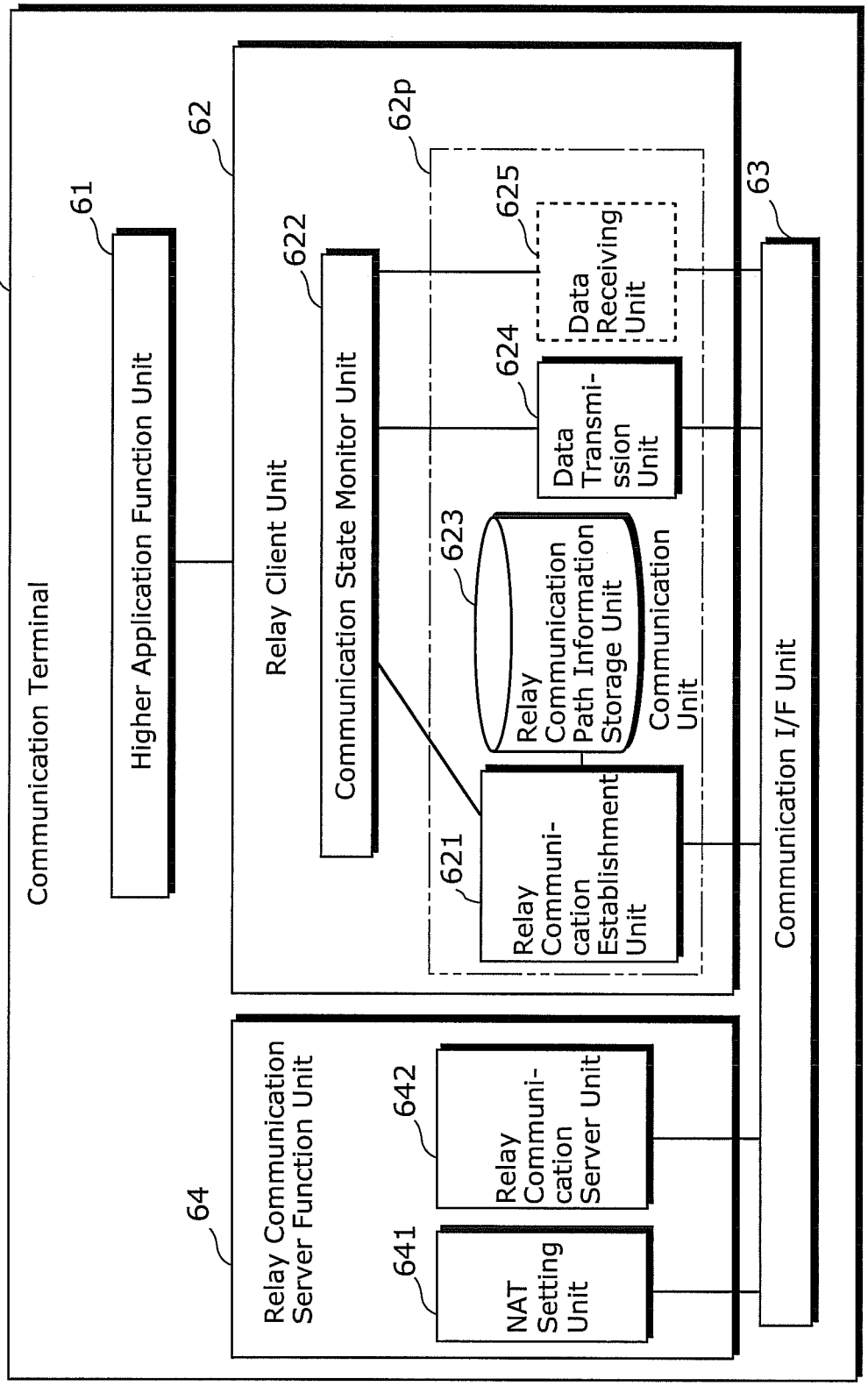
FIG. 7 is a block diagram showing an example of a functional structure of a communication terminal having a relay communication server function according to the embodiment of the present invention.

FIG. 7 is a diagram showing an example of a basic structure of a communication terminal 6L having a relay server function.

Here, the same reference numerals of FIG. 2 are assigned to the identical functional units of FIG. 7, so that the identical units are not explained again below.

A communication terminal 6L includes a relay communication server function unit (relay communication server function) 64.

The relay communication server function unit 64 is a functional unit that provides the same function as those of the relay servers 4a to 4N in FIG. 1. In other words, in the description with reference to FIGS. 1 to 6, the common function of the relay servers 4a to 4N has been described. The relay communication server function unit 64 has a function similar to the common function. For example, the relay communication server function unit 64 has the same function as the common function. The relay communication server function unit 64 differs from the relay servers 4a to 4N in that the communication terminal 6L has a function (a NAT setting unit 641) of setting a NAT function of a router to allow the Internet to connect to the communication terminal 6L (FIG. 7) because the communication terminal 6L, unlike the relay servers 4a to 4N, is sometimes connected to a local network under the router.

The relay communication server function unit 64 includes the following functional units. That is, the relay communication server function unit 64 includes the NAT setting unit 641 and a relay communication server unit 642.

The NAT setting unit 641 sets the NAT function of the router, so that the Internet can be connected to the relay communication server unit 642 (in other words, connected to the communication terminal 6L and the relay communication server function unit 64). Here, the NAT setting unit 641 can perform the NAT setting, by transmitting a specific command to the router by using Internet Gateway Device (IGD) specification of Universal Plug and Play (UPnP) provided from the router or Common Gateway Interface (CGI) for the NAT setting.

The relay communication server unit 642 provides the function similar to (for example, the same as) the previously-described function of the above-described relay servers 4a to 4N. Thereby, the NAT setting set by the NAT setting unit 641 allows the Internet to access the relay communication server unit 642, even if the communication terminal 6L is connected to the local network under the router. Then, to the center server 3, the relay communication server unit 642 resisters, as a part of the relay server information, address information (an IP address and a port number) for accessing the relay communication server unit 642 from the Internet. An access device for accessing from the Internet obtains relay server information including the registered address information, and thereby accesses the relay communication server unit 642 of the communication terminal 6L by using the address information included in the obtained relay server information.

Figure 8:
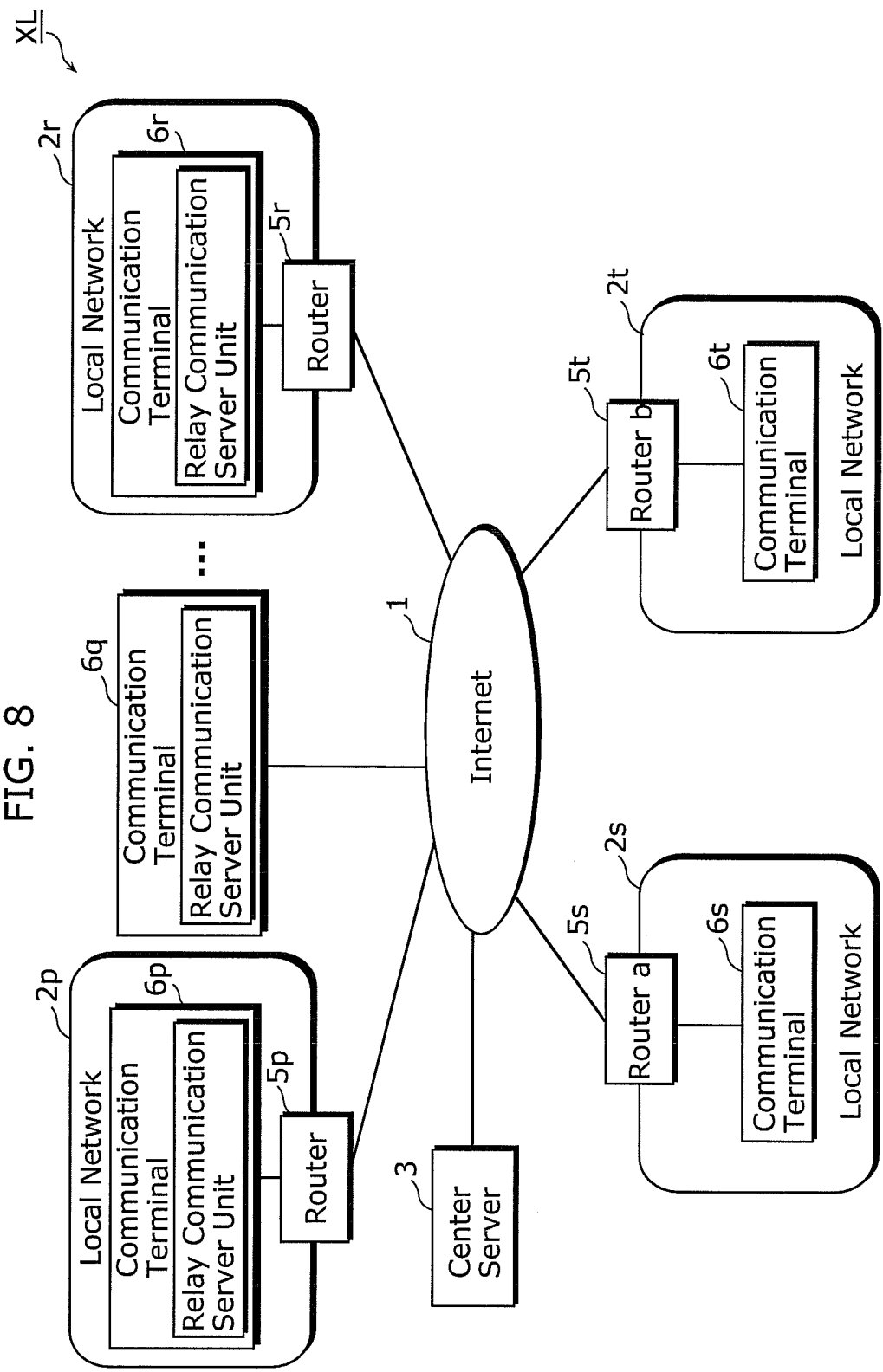
FIG. 8 is a diagram showing an example of a configuration of a network that connects communication terminals each having a relay communication server function to each other according to the embodiment of the present invention.

FIG. 8 shows an example of a network configuration including the communication terminal 6L having the above-described structure.

A system XL includes the center server 3 and local networks 2p to 2t. The center server 3 and the local networks are connected to one another via the Internet 1.

At least one of the communication terminals 6p to 6t is the above-described communication terminal 6L shown in FIG. 7. For example, the communication terminal 6L (6p) in FIG. 7 serves as the communication terminal 6p in FIG. 8. Here, if the communication terminal 6L serves as the communication terminal 6p, at least one of the other communication terminals except the communication terminal 6L may have a function that is partly different from the function of the communication terminal 6L. For example, at least one of the other communication terminals does not have the relay communication server function unit 64.

The communication terminal 6L having the relay communication server function unit 64 shown in FIG. 7 is connected to the local network 2p or the like under a router, or connected directly to the Internet 1. In the above-described situation where the communication terminal 6L serves as the communication terminal 6p, the communication terminal 6L is connected to the local network 2p under a router 5p. On the other hand, if the communication terminal 6L serves as the communication terminal 6q, the communication terminal 6L is connected directly to the Internet 1.

In any situations, if the Internet 1 can access the relay communication server function unit 64 of the communication terminal 6L, the relay communication server function unit 64 uses the address information of the communication terminal 6L to register, into the center server 3, the address information (an IP address and a port number) by which the Internet 1 can access the communication terminal 6L.

The communication terminal (for example, the communication terminal 6s) that intends to communicate with another communication terminal obtains relay server information from the center server 3, as described above (refer to S31 in FIG. 3). Thereby, the other communication terminal such as the communication terminal 6s can use the communication terminal 6L (the communication terminal 6p) having the relay communication server function unit 64 as one of the relay servers 4a to 4N shown in FIG. 1 and the like.

As explained above, the communication terminal 6L having the relay communication server function unit 64 makes it possible to perform relay communication without the relay servers 4a to 4N in FIG. 1 dedicated to relay. In addition, if the communication terminal in the system XL has the relay communication server function unit 64 like the communication terminal 6L, the number of devices serving as a relay server is increased. As a result, it is possible to reduce a cost of the system and improve a scalability of the system.

It should be noted that it has been described in the embodiment that a plurality of relay communication paths are firstly established in the connection sequence of FIG. 3 (refer to steps S31 and S32 in FIG. 3), but it is also possible that a single relay communication path is firstly established, then the communication state monitor unit 622 monitors data packets transmitted by the data transmission unit 624 of the transmitting communication terminal 6a and the data transmission unit of the receiving communication terminal 6b, and thereby a relay communication path is added or removed depending on a data amount or a data transmission band.

It is further possible that a plurality of relay communication paths are firstly established, then the communication state monitor unit 622 monitors data packets transmitted by the data transmission unit 624, and thereby a relay communication path is added or removed depending on a data amount or a data transmission band.

As described above, a relay communication path is added or removed depending on a data amount or a data transmission band of data packets transmitted by the data transmission unit 624. As a result, it is possible to release unnecessary relay servers, and therefore use relay servers efficiently.

In should also be noted that it has been described in the embodiment that a target relay communication path is determined as unsuitable if statistical information such as an average and a variation of a transmission delay of the relay communication path or a value of the largest transmission delay does not satisfy a predetermined criterion. However, it is also possible that the relay client unit 62 determines that a target relay communication path is unsuitable if a packet loss rate does not satisfy a predetermined criterion.

The determination makes it possible to avoid a relay communication path having a high packet loss rate, thereby stabilizing communication between communication terminals.

It should also be noted that it has been described in the embodiment that, when data is transmitted from or received by the higher application function unit 61, a communication state of the relay communication path is monitored to be estimated, and thereby it is determined whether or not the relay communication path is suitable. However, it is also possible that, after connection of the relay communication path and before the data transmission/reception of the higher application function unit 61, test data is transmitted/received to confirm that the relay communication path is suitable. In the above case, when it is determined that the relay communication path is unsuitable, another relay communication path is established and test data is used to confirm whether the newly-established relay communication path is suitable.

Such confirmation using test data makes it possible to eliminate unnecessary relay communication path before data transmission/reception of the higher application function unit 61. As a result, communication is stabilized between communication terminals.

It should also be noted that it has been described in the embodiment that the data transmission unit 624 divides transmission data provided from the higher application function unit 61 into packets each having a predetermined size, and transmits the packets on the relay communication paths. However, it is also possible that the data transmission unit 624 performs operations to generate redundant packets from n packets which are generated by dividing transmission data into n pieces according to a predetermined number n, and then transmits the packets including the generated redundant packets.

As described above, since the redundant packets are transmitted, when a packet loss occurs on a certain relay communication path, the data receiving unit 625 of a receiving communication terminal reconstructs the loss packet from a redundant packet. As a result, the number of retransmissions can be reduced.

It is further possible that the data transmission unit 624 of a transmitting communication terminal encrypts transmission data (original data) provided from the higher application function unit 61 and transmits the encrypted data, and the data receiving unit 625 of a receiving communication terminal decrypts the encrypted data to reconstruct the original data. Thereby, security can be improved in various situations requiring the security improvement. For example, security can be improved in relay communication using the relay communication server function unit 64 of the communication terminal 6L.

It should be noted that the center server 3 may manage information indicating categories of the respective relay servers, as a part of relay server information. Thereby, with reference to the categories of the relay servers, the communication terminal 6 performs control to select relay servers having a predetermined category which are equal to or more than a predetermined number. For example, such categories of the relay servers can be used to distinguish relay servers dedicated to relay from the relay server function provided by the communication terminal 6L. If the communication terminal 6 selects reliable relay servers dedicated to relay which are equal to or more than a predetermined number (for example, one), it is possible to prevent attacks of malicious relay communication server function units 64. For example, it is possible to prevent a malicious relay communication server function unit 64 from stealing all transmission data. It should also be noted regarding the category that relay servers belonging to different categories may have different predetermined quality. For example, more specifically, relay servers belonging to different categories may have different safety. For example, more specifically, relay servers belonging to different categories may have different security of their relay communication paths.

According to the present invention, it is possible to realize a communication terminal and a communication method, by which a large processing load is not imposed on a device providing a relay function and a communication band on relay of each relay function can be reduced, when relay of relay servers connects communication terminals to each other to communicate.

More specifically, the communication terminal (the communication terminal 6) communicates with a partner communication terminal via relay function units (the relay servers 4a to 4N, the relay communication server function unit 64) on a network. The communication terminal 6 includes the following functional units. The relay communication establishment unit (the relay communication establishment unit 621) selects a plurality of relay function units on the network, and establishes communication paths (relay communication paths) to the partner communication terminal via the selected relay function units, respectively. The communication state monitor unit (the communication state monitor unit 622) estimates communication states of communication between the communication terminal and the partner communication terminal on the respective communication paths (the relay communication paths) via the respective relay function units. Based on the estimation results, the communication state monitor unit instructs the relay communication establishment unit to perform one of: (a) removal of a communication path; (b) new establishment of a communication path (new relay communication path) to the partner communication terminal via a new relay function unit; and (c) both the removal and the new establishment. When the instruction is received from the communication state monitor unit, the relay communication establishment unit transmits, to the partner communication terminal, a connection request message including address information of the new relay function unit, when the new communication path is to be established to the partner communication terminal via the new relay function unit.

With the above structure, it is possible to achieve communication between communication terminals connected to local networks under NAT.

Moreover, the communication terminal device (the transmitting communication terminal 6a, the communication terminal 6, the communication terminal 6L) communicates with a partner communication terminal device (the receiving communication terminal 6b) via relay devices (the relay servers 4a to 4N, the communication terminal 6L) on a network. The communication terminal device includes the following functional units. The relay communication establishment unit (the relay communication establishment unit 621) selects a plurality of relay devices on a network which are to be used in communication, and establishes relay communication paths to the partner communication terminal device via the respective selected relay devices (selected relay servers). The communication state monitor unit (the communication state monitor unit 622) estimates communication states of communication with the partner communication terminal for the respective communication paths of the selected relay devices. The data receiving unit (the data receiving unit 625) receives divided pieces of data from the partner communication terminal device via the selected relay devices, and reconstructs data by synthesizing the received pieces of data. The data transmission unit (the data transmission unit 624) divides data to be transmitted to the partner communication terminal device, and transmits the divided pieces of data via the selected divided relay devices. The communication state monitor unit estimates the communication states of the respective relay communication paths, and based on the estimation results, instructs, to the relay communication establishment unit, removal of a relay communication path, addition of a new communication path, or both the removal and the addition. When the new relay communication path is to be added, the relay communication establishment unit transmits, to the partner communication terminal device, a connection request message including address information of a new relay device of the new relay communication path.

It should be noted that, in the above-described systems X and XL, each of (a) the data to be transmitted from the transmitting communication terminal 6a to the receiving communication terminal 6b and (b) the data to be transmitted from the receiving communication terminal 6b to the transmitting communication terminal 6a may be divided into pieces of parallel communication data (packet group) to be transmitted on different relay communication paths for divided transmission (high-speed transmission). Or, the divided transmission may be performed only for the data to be transmitted from the transmitting communication terminal 6a (the data to be transmitted from the receiving communication terminal 6b is not necessarily divided), or only for the data to be transmitted from the receiving communication terminal 6b (the data to be transmitted from the transmitting communication terminal 6a is not necessarily divided). Furthermore, the communication terminal 6 uses the communication state monitor unit 622 to provide a monitor device that monitors communication quality. The communication terminal 6 also uses the relay communication establishment unit 621 to provide a selection device that selects relay devices. The above monitor device selects relay devices by itself. However, the monitor device may not select relay devices by itself. More specifically, for example, the above-described receiving communication terminal 6n (or a device corresponding to the transmitting communication terminal 6b) serves as a monitor device. In other words, for example, the monitor device is the above-described receiving communication terminal 6b (or a device corresponding to the transmitting communication terminal 6b) which monitors (estimates) quality of relay communication paths, notifies the monitor results (estimation results) to the communication partner (the transmitting communication terminal 6a), and requests the communication partner to re-establish the relay communication paths.

With the above, there is provided a communication system (the system X, the system XL) that includes a partner communication terminal (the receiving communication terminal 6b) and a communication terminal (the transmitting communication terminal 6a, the communication terminal 6, and the communication terminal 6L) communicating with the partner communication terminal via relay devices (the relay servers 4a and the like, the communication terminal 6L).

Here, in this communication system, each of the communication terminals (the communication terminal 6a, the communication terminal 6b, the communication terminal 6p, and the like) communicating with one another is a communication terminal connected to a local network under NAT. For example, in this communication system, more specifically, the communication terminals form a communication system in which they are connected to one another by Peer to Peer (P2P) connection.

The communication terminal communicates with the partner communication terminal via relay servers. The communication terminal includes the following functional units. The communication unit (the communication unit 62p) transmits, via a plurality of relay devices, pieces of divided data (packets) which are generated by dividing communication data (transmission data) into pieces. The communication state monitor unit (the communication state monitor unit 622) monitors, for each of the relay devices, a communication state (for example, a transmission delay) of communication for the divided data transmitted via the target relay device. Based on the estimation results of estimating the respective monitored communication states, the communication state monitor unit changes (switches) from the current set of the relay devices (for example, the relay servers a, b, and c in FIG. 5) to a new set of relay devices (for example, the relay servers a, d, and c in FIG. 5) at least one of which is not included in the current set, so as to be used to transmit the pieces of divided data.

Thereby, the communication data is transmitted at a high speed via the relay servers, for example, transmitted in parallel.

Mere high-speed communication deteriorates a stability of communication quality (estimation) of the communication data, which is not enough for implementation. This is because there are a plurality of relay devices in the communication. For example, a possibility of disconnection of the communication data transmission increases k times (k is the number of used relay devices: k≥2), and a stability of quality (estimation) is deteriorated k times (for example, doubles). However, in the communication system, a communication state (for example, a transmission delay) of each relay communication path is monitored. Thereby, based on the estimation results (for example, an average value of transmission delays) of estimating all of the communication states, the relay devices to be used are changed from a current set of relay devices to a new set of relay devices. Thereby, it is possible to stabilize quality (estimation) of communication of the communication data.

It should be noted that the communication unit may transmit at least a part or all of the pieces of divided data via two or more relay devices sequentially. It is also possible that the communication unit may transmit at least a part or all of the pieces of divided data in parallel, via relay devices whose number is equal to the number of these transmitted pieces of data, so that different pieces of divided data are transmitted via respective different relay devices. Any of the plurality of relay devices transmits at least one of the pieces of divided data.

This communication terminal (the communication terminal 6, the transmitting communication terminal 6a) selects the relay devices from predetermined N relay devices (N≥2). The communication terminal includes the following functional units. The relay communication establishment unit (the relay communication establishment unit 621) establishes relay communication paths between the communication terminal and the partner communication terminal via the selected relay devices (selected relay servers), respectively. The communication state monitor unit instructs, based on estimation results of estimating the respective communication states, the relay communication establishment unit to perform one of: (a) removal of a relay communication path from relay communication paths of the current set of the relay devices; (b) addition of a relay communication path to the relay communication paths; and (c) both the removal and the addition. When the relay communication establishment unit receives the instruction from the communication state monitor unit, the relay communication establishment unit performs processing according to the instruction.

Here, each of the relay communication paths is a communication path from a relay source that relays data on the relay communication path to a relay destination.

More specifically, the relay communication establishment unit may include functions of known general-purpose software such as known libraries and packages for establishing and deleing of relay communication paths, for example. Using the functions, the relay communication establishment unit may provide the previously-described functions.

The relay communication establishment unit may be provided outside the communication unit 62p, or provided as a part of the communication unit 62p.

Moreover, for example, the communication state monitor unit may perform: (a) the first control for controlling the relay communication establishment unit to perform the above-described addition; (b) the second control for controlling the relay communication establishment unit to perform the above-described removal; and (c) the third control for controlling the relay communication establishment unit to perform both the addition and the removal. In other words, more specifically, for example, the communication state monitor unit may select one of the first to third controls to control the relay communication establishment unit to perform the selected control.

The communication unit in the communication terminal includes the following functional units. The data transmission unit (the data transmission unit 624) divides the communication data into the above-described pieces of divided data, and transmits the pieces of divided data via the respective relay devices (the selected relay servers) selected by the relay communication establishment unit. The data receiving unit (the data receiving unit 625) receives pieces of divided data, which are generated by dividing communication data in the partner communication terminal side, from the partner communication terminal via the relay devices selected by the relay communication establishment unit, respectively, and reconstructs the original communication data from the received pieces of divided data. When the communication state monitor unit instructs the relay communication establishment unit to add a new relay communication path, the relay communication establishment unit transmits, to the partner communication terminal, a connection request message (the relay server switch request message at step S53 in FIG. 5) including address information of a new relay device of the new relay communication path to be added.

In other words, for example, when the data transmission unit transmits the pieces of divided data via the respective relay devices, any relay device in the relay devices performs at least one relay for the pieces of divided data. More specifically, for example, the data transmission unit transmits target pieces of divided data among the above-described pieces of divided data via respective relay devices whose number is equal to the number of the target pieces of the divided data, so that different pieces of divided data are transmitted via respective different relay devices.

Furthermore, when the data receiving unit receives the pieces of divided data via the respective relay devices, any relay device in the relay devices performs at least one relay for the pieces of divided data. More specifically, for example, the data receiving unit receives target pieces of divided data among the above-described pieces of divided data via respective relay devices whose number is equal to the number of the target pieces of the divided data, so that different pieces of divided data are received via respective different relay devices.

Moreover, for example, the communication state monitor unit monitors a transmission delay of each of the plurality of the relay communication paths to the partner communication terminal. Thereby, the communication state monitor unit detects a relay communication path having a transmission delay that does not satisfy predetermined allowable conditions (for example, minimum conditions for allowing appropriate communication of communication data). If the detection is made, the communication state monitor unit instructs the relay communication establishment unit to perform one of: (a) removal of the detected relay communication path; (b) establishment of a new communication path to the partner communication terminal via a new relay device; and (c) both the removal and the establishment.

Furthermore, for example, the communication state monitor unit monitors a packet loss on each of the plurality of the relay communication paths to the partner communication terminal. Thereby, the communication state monitor unit detects a relay communication path having a packet loss that does not satisfy predetermined allowable conditions. If such a relay communication path is detected, the communication state monitor unit instructs the relay communication establishment unit to perform one of: (a) removal of the detected relay communication path; (b) establishment of a new communication path to the partner communication terminal via a new relay device; and (c) both the removal and the establishment.

Moreover, for example, based on a traffic amount of the communication data, the communication state monitor unit instructs the relay communication establishment unit to perform one of: (a) removal of a relay communication path from the relay communication paths established by the relay communication establishment unit; and (b) establishment of a new communication path to the partner communication terminal via a new relay device.

In addition, for example, when the relay communication establishment unit establishes the new relay communication path to the partner communication terminal via the new relay device, the communication state monitor unit transmits predetermined estimation data (test data) to the new relay communication path, in order to estimate the new relay communication path. Thereby, the relay communication establishment unit estimates a communication state of communication on the new relay communication path. If a result of the estimation satisfies predetermined conditions, the communication state monitor unit causes the communication unit to use the new relay communication path for transmission of communication data provided from the higher application layer in the communication terminal.

Furthermore, more specifically, the communication state monitor unit detects that the partner communication terminal has not received a part of the pieces of vided data transmitted from the communication unit to the partner communication terminal via relay devices (the packet loss PL in FIG. 4). When the communication state monitor unit made the detection, the communication unit retransmits the part of the pieces of divide data to the partner communication terminal on a different relay communication path via a relay device (the relay server a) that is different from the relay device (the relay server b) used by the communication unit to transmit detected part (step S43 in FIG. 4).

In the retransmission, the communication unit selects a relay device (the relay server a) having a transmission delay smaller than a transmission delay of the predetermined relay device (for example, the relay server c) in the communication to the partner communication terminal via the relay devices, and thereby performs the retransmission on a relay communication path of the selected relay device.

For each of pieces of communication data provided from the higher application layer (the higher application function unit 61 or the like) in the communication terminal, the communication unit stores a correspondence relationship between (a) a corresponding one of the pieces of communication data and (b) relay communication paths on which communication for pieces of divided data, which are generated by dividing the corresponding one of the pieces of communication data, is performed. When the higher application layer notifies said communication unit with completion of the communication or the partner communication terminal notifies said communication unit with end of the communication, the communication terminal releases all of the relay communication paths indicated by the correspondence relationship as corresponding to the notified piece of communication data (refer to FIG. 6).

The relay communication establishment unit stores pieces of category information each of which indicates a category of a corresponding one of the predetermined N relay devices. Based on the stored pieces of category information, the relay communication establishment unit selects the relay devices from among the N relay devices. The selected relay devices include at least one relay device belonging to a predetermined category (for example, a category indicating a relay communication path having a high security) in the pieces of category information. The communication unit encrypts pieces of divided data to be transmitted via relay devices (relay servers of relay communication paths having a low security) not belong to the predetermined category among the selected relay devices. Then, the communication unit transmits the encrypted pieces of divided data via the relay devices not belonging to the predetermined category. In addition, the communication unit transmits information required to decrypt the encrypted pieces of divided data via the relay device (namely, a relay server of a relay communication path having a high security) belonging to the predetermined category in the pieces of category information among the selected relay devices.

Then, the communication unit generates redundant data from the pieces of divided data to be transmitted on the relay communication paths via the relay devices, so that the pieces of divided data are reconstructed from (a) a part of the pieces of divided data and the redundant data or (b) the redundant data only. The communication unit transmits the generated redundant data to the partner communication terminal on a relay communication path different from the relay communication paths on which the pieces of divided data are transmitted.

The redundant data is used to reconstruct pieces of divided data from which the redundant data is generated, in the similar manner where, for example, Redundant Arrays of Inexpensive Disks (RAID) data is used to reconstruct lost data. The lost data means data all of which is lost, or a part of which is lost. Even if at least a part of (in other words, a part or all of) the pieces of divided data is lost, it is possible to reconstruct the pieces of divided data from the redundant data.

If the communication state monitor unit instructs the relay communication establishment unit to add the new relay communication path (for example, the situation in FIG. 5 for adding the relay communication path of the relay server d), the relay communication establishment unit transmits the connection request message to the partner communication terminal via a relay device (the relay server a) for which a relay communication path has been established among the other relay devices except the new relay device (the relay server d) of the new relay communication path.

The communication terminal 6L includes a NAT setting unit (the NAT setting unit 641) and a relay communication server unit (the relay communication server function unit 64). The NAT setting unit performs Network Address Translation (NAT) setting for a router (the router 5p) of a local network (for example, the local network 2p) including the communication terminal 6L. The relay communication server unit is connected from at least two other communication terminals (for example, the communication terminals 6s and 6t), and relays communication for the pieces of divided data between these other communication terminals.

Here, for example, this communication system has the following configuration. In the communication system, the partner communication terminal (the transmitting communication terminal 6a), which transmits communication data to the receiving communication terminal 6b, includes a relay communication establishment unit (the relay communication establishment unit 621 in the transmitting communication terminal 6a). The relay communication establishment unit in the partner communication terminal selects a plurality of relay devices from the predetermined N relay devices (N≥2), and established relay communication paths between the receiving communication terminal and the transmitting communication terminal (the partner communication terminal) via the selected relay devices, respectively. The communication state monitor unit 622 in the receiving communication terminal 6b monitors communication states of communication for pieces of divided data transmitted via the respective selected relay devices, so as to calculate estimation results of estimating the monitored communication states. Based on the calculated estimation results, the communication state monitor unit 622 instructs the relay communication establishment unit 621 in the transmitting communication terminal 6a to perform one of: (a) removal of a relay communication path from relay communication paths of the current set of the relay devices; (b) addition of a new relay communication path to the relay communication paths of the current set of the relay devices; and (c) both the removal and the addition. When the instruction is received from the communication state monitor unit 622 in the receiving communication terminal 6b, the relay communication establishment unit 621 in the transmitting communication terminal 6a performs processing according to the instruction.

The above description provides a communication method of communicating with a partner communication terminal via relay devices. The communication method includes the following steps. At the communicating step, pieces of divided data generated by dividing communication data into the pieces are transmitted via relay devices. Then, at the communication state monitor step, a communication state of communication of a piece of the divided data transmitted via each of the relay devices is monitored, and based on estimation results of estimating the monitored communication states, a current set of the relay devices on which the pieces of divided data are currently transmitted is changed to a new set of relay devices at least one of which is not included in the current set. The above method may be implemented as a computer program causing a computer to execute the above steps including the communication step. The above method may be implemented as a computer program causing a computer (communication terminal) to have functions of executing the above steps including the communication step.

Here, in order to solve the problems described in "Problems that Invention is to Solve", the following method can be conceived. By the method, there are a plurality of communication terminals providing relay functions connected with a target communication terminal. Therefore, relay loads can be distributed into the respective relay functions. As a result, a communication band on relay of the relay functions can be reduced, without imposing large loads on the communication terminals providing the relay functions. However, the above configuration has the following drawbacks. Since there are the plurality of relay functions connected with the target communication terminal, there are a plurality of different communication paths to a partner communication terminal via the respective used relay functions. As a result, variation of communication delay is increased. In addition, troubles would occur in the used relay functions or the communication paths during the communication. Thereby, a probability of failing the communication between the communication terminals is increased.

In order to address these drawbacks, the communication (the communication terminal 6, the communication terminal 6L) according to the embodiment has the above-described configuration.

The communication terminal according to the embodiment communicates with another communication terminal via relay function units (the relay servers 4a to 4N, for example) on a network. The communication terminal has the following functional units. The data receiving unit (the data receiving unit 625) receives data from the network. The relay communication establishment unit (the relay communication establishment unit 621) selects relay function units (relay servers, for example) on the network used in communication, and establishes relay communication paths. The communication state monitor unit (the communication state monitor unit 622) monitors a communication state of communication with a partner communication terminal, for each of the communication paths of the relay function units. The data transmission unit (the data transmission unit 624) transmits data to the network. More specifically, the relay communication establishment unit selects a plurality of relay function units on the network, and establishes communication paths to the partner communication terminals via the respective relay function units. The data transmission unit transmits transmission data, which is provided from the higher application layer (the higher application function unit 61), on the communication paths (the relay communication paths) established by the relay communication establishment unit. The data receiving unit reconstructs the original transmission data from received pieces of data transmitted on the communication paths. The communication state monitor unit estimates communication states of communication with the partner communication terminal on the communication paths via the relay function units. Based on the estimation results, the communication state monitor unit instructs the relay communication establishment unit to perform one of: (a) removal of a communication path; (b) new establishment of a new relay communication path to the partner communication terminal via a new relay function unit; and (c) both the removal and the new establishment. When the relay communication establishment unit receives instruction from the communication state monitor unit to establish a new communication path (relay communication path) to the partner communication terminal via a new relay function unit, the relay communication establishment unit transmits, to the partner communication terminal, a connection request message including address information of the new relay function unit.

The relay communication establishment unit establishes a plurality of relay communication paths, and the data transmission unit transmits data on the communication paths. As a result, it is possible to reduce traffic on a single relay communication path, and thereby narrow a communication band on relay of the relay functions.

Furthermore, the communication state monitor unit estimates communication states of communication to the partner communication terminal on communication paths via the relay function units. Based on the estimation results, the communication state monitor unit removes a communication path or adds a new relay function unit. It is therefore possible to remove a relay communication path having a large relay communication path or a relay communication path having a high packet loss rate, and establish a new relay communication path instead of the removed relay communication path. As a result, communication between communication terminals is stabilized.

When a new communication path is to be establish to the partner communication terminal via the new relay function unit, the relay communication establishment unit transmits, to the partner communication terminal, a connection request message including address information of the new relay function unit. Thereby, the partner communication terminal can establish a relay communication path from a corresponding local network to the Internet. Therefore, the dynamic NAT setting for a router makes it possible to establish a relay communication path without any specific setting by a user.

Figure 9:
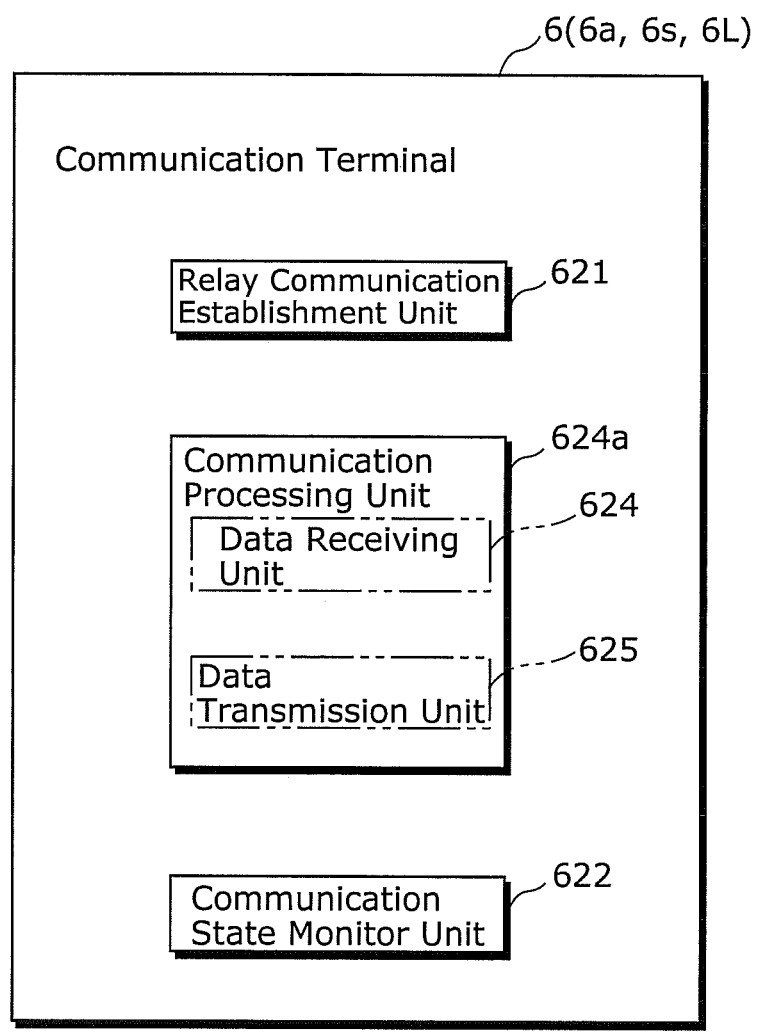
FIG. 9 is a diagram showing a communication terminal.

FIG. 9 is a diagram showing the communication terminal 6 (the communication terminal 6a, the communication terminal 6s, for example).

In other words, the communication terminal according to the present embodiment (the communication terminal 6a, 6s, or 6L, for example) is a communication terminal connected to a local network (the local network 2a or 2s) to communicate with a partner communication terminal (the communication terminal 6b, the communication terminal 6t, for example) via relay devices (the relay servers 4a to 4N in FIG. 1, the communication terminal 6p in FIG. 8, the communication terminal 6, for example) assigned with addresses of a global network (for example, the Internet 1). The communication terminal includes the following functional units The relay communication establishment unit (the relay communication establishment unit 621) transmits a packet to an address of each of the relay devices to establish communication paths, so that each of the relay devices transmits another packet on a corresponding one of the communication paths to a source address of the packet transmitted from the communication terminals so as to transmit the other packet to the communication terminal (the communication terminal 6a or the like). The communication unit (one of the data transmission unit 624 and the receiving unit 625 included in the communication processing unit 624a, the communication processing unit 624a, or the entire unit including the communication processing unit 624a (such as the communication unit 62p) performs communication for pieces of divided data, which have been divided from communication data, via the relay devices to the partner communication terminal. The communication state monitor unit (the communication state monitor unit 622) monitors, for each of the relay devices, a communication state of the communication for a corresponding piece of the pieces of divided data transmitted via the corresponding relay device. Based on the estimation results of estimating the respective monitored communication states, the communication state monitor unit changes the current set of relay devices to a new set of relay devices at least one of which is not included in the current set, so as to be used for the communication.

Here, the communication processing unit 624a is a functional block including the above-described data transmission unit 624 and the data receiving unit 625. FIGS. 2 and 7 do not show the communication processing unit 624a.

In other words, the communication terminal according to the present embodiment is connected to a local network (the local network 2a or 2s). More specifically, for example, each of the communication terminal according to the present embodiment (the communication terminal 6a, 6s, or 6L, for example) and the partner communication terminal (the communication terminal 6b or 6, for example) is one of a plurality of computers connected to one another by P2P connection (the communication terminals 6a to 6b, the relay servers 4a to 4N, and the like in FIG. 1, the communication terminals 6p to 6t in FIG. 8).

Therefore, when the communication terminal according to the present embodiment and a server or the like (for example, a relay device) on a global network (the Internet 1) communicate with each other, the dynamic NAT setting is necessary. In the dynamic NAT setting, a packet is transmitted from the communication terminal according to the present embodiment to a server or the like, and then detected by the NAT function. Then, the NAT function, which has detected the packet, sets an address translation rule into the NAT function itself. The above translation rule is a rule of translation between a private address on a local network and a global address on a global network. In other words, the above translation rule is a rule of translation between a private address of the communication terminal according to the present embodiment and a private address. Setting of such a translation rule makes it possible to establish communication paths between the communication terminal according to the present embodiment and a server. In other words, by the dynamic NAT setting, the translation rule is automatically set to the NAT function. As a result, communication between the communication terminal according to the present embodiment and the server is possible. More specifically, after the NAT function sets the translation rule, the server or the like on the global network transmits packets to a source address (source IP address and port number) of packets transmitted from the communication terminal according to the present embodiment. Thereby, the server or the like can communicate with the communication terminal connected to the local network.

Such a NAT function is provided in, for example, a router (the router 5a, the router 5s) at a boundary between the local network and the global network. The router may have a firewall function in addition to the above-described NAT function.

The firewall function is a function of monitoring packets passing the router and discarding unpermitted packets. The firewall function provides a function of preventing hacking from the global network (the Internet 1) to the local network (the local network 2a or 2s).

Likewise the NAT function of a router, it is known regarding the firewall function that allowable conditions for passing a firewall is automatically set in the firewall function, when, for example, the communication terminal (the communication terminal 6a, 6s, for example) connected to the local network transmits packets to the server or the like (a relay device, for example) on the global network (the Internet 1). Therefore, when the communication terminal (the communication terminal 6a or 6s) on the local network starts communicating with the server or the like (a relay device, for example) on the global network, the above setting enables the server or the like to communicate with the communication terminal over the firewall by transmitting packets to the source address of the received packets.

Therefore, the relay communication establishment unit transmits a packet to the relay device so as to cause a predetermined communication control unit (one or both the NAT function and the firewall function) to detect the transmitted packet. Thereby, the communication control unit that made the detection establishes a communication path between the communication terminal and the relay device.

It should be noted that it has been described in the above example that the NAT function is provided to the router (the router 5a, the router 5s) at the boundary between the local network and the global network. Therefore, address translation performed by the dynamic NAT setting provides a network configuration in which the communication terminal according to the present embodiment and the server or the like (a relay device, for example) on the global network (the Internet 1) can communicate with each other. However, it is also possible to conceive a network in which the router (the router 5a, the router 5s) at the boundary between the local network and the global network does not have the NAT function but has the firewall function only. In the above case, the communication terminal according to the present embodiment (the communication terminal 6a, 6s, for example) connected to the local network transmits a packet to the server or the like (a relay device, for example) on the global network (the Internet 1). Thereby, allowable conditions for passing the firewall is automatically set in the firewall function. As a result, the communication terminal and the server or the like (a relay device, for example) on the global network (the Internet 1) can communicate with each other.

Here, the establishment of a communication path means, for example, setting of a communication path.

It should also be noted that the relay communication establishment unit may establish a communication path to a relay device in the same processing as the establishment of a communication path, by using Traversal Using Relay NAT (TURN) disclosed in Non-Patent Reference 1.

In the communication terminal according to the present embodiment, the relay communication establishment unit establishes communication paths (the transmitting partial communication paths) between the communication terminal according to the present embodiment and the respective relay devices (two or more devices among the relay servers 4a to 4N, the communication terminal 6L (the communication terminal 6p, the communication terminal 6q)). Thereby, the communication paths (the relay communication paths) between the communication terminal according to the present embodiment and the partner communication terminals (the communication terminal 6b, the communication terminals 6p to 6r, the communication terminal 6t) are set via the respective relay devices.

Then, the communication unit transmits pieces of divided data, which are generated by dividing communication data into the pieces, on the respective communication paths in order to transmit the communication data.

Here, the communication relay (including switch between relay paths) by a router or the like is generally an operation having predetermined communication paths (routing table). Therefore, it is not performed that a one-to-one relationship is made at start and end of communication of a certain communication terminal and thereby a communication path to be used is dynamically selected and determined to be set.

On the other hand, in the communication terminal according to the present embodiment, a general terminal (the communication terminal 6p, the communication terminal 6q, for example) serves as a relay server. It is therefore crucial to dynamically determine a relay device to be used.

From the above reasons, for the communication terminal according to the present embodiment, a communication path from the communication terminal, then the relay server group, and to the partner communication terminal is dynamically determined to be set at start of communication or during the communication.

More specifically, the communication state monitor unit changes a used set of relay devices to a new set of relay devices at start of communication or during the communication. Although the used relay devices are general terminals, it is therefore possible to keep suitable communication paths by the plurality of relay devices. As a result, communication can be performed appropriately.

As described above, in the communication terminal according to the present embodiment, the relay communication establishment unit, the communication unit, and the communication state monitor unit are combined to produce synergistic effects. On the other hand, the conventional techniques miss a part or all of these units, therefore failing to produce the synergistic effects. The communication terminal according to the present embodiment differs from the conventional techniques in producing the synergistic effects.

INDUSTRIAL APPLICABILITY

The present invention can provide a communication terminal and a communication method, by which, when communication terminals are connected to each other to communicate by using relay processing of relay server(s), it is possible to prevent a large processing load on a communication terminal providing a relay function to serve as the relay server(s), and to reduce a communication band on the relay of each relay function.

In addition, the present invention can increase a speed of data communication between a communication terminal and its partner communication terminal, and stabilize quality of the communication.

NUMERICAL REFERENCES

1 Internet
2 local network
3 center server
4a to 4N relay server
5, 5a, 5b router
6, 6a, 6b communication terminal
61 higher application function unit
62 relay client unit
63 communication I/F unit
64 relay communication server function unit
621 relay communication establishment unit
622 communication state monitor unit
623 relay communication path information storage unit
624 data transmission unit
624a communication processing unit
625 data receiving unit
641 NAT setting unit
642 relay communication server unit

The invention claimed is:

1. A communication terminal connected to a local network to communicate with a partner communication terminal via relay devices each assigned with an address on a global network, said communication terminal comprising:

a relay communication establishment unit configured to transmit a packet to an address of each of the relay devices to establish communication paths, so that each of the relay devices transmits another packet on a corresponding one of the communication paths to a source address of the packet transmitted from said communication terminal so as to transmit the another packet to said communication terminal;

a communication unit configured to perform communication for pieces of divided data via the relay devices, the pieces of divided data being generated by dividing communication data into the pieces; and a communication state monitor unit configured to (i) monitor, for each of the relay devices, a communication state of the communication of a corresponding piece of the pieces of divided data transmitted via the corresponding relay device, and (ii) change a current set of the relay devices to a new set of relay devices at least one of which is not included in the current set so as to be used for the communication, based on estimation results of estimating the monitored communication state for the each of the relay devices, wherein said relay communication establishment unit is configured to (i) select the relay devices from predetermined N relay devices, where N≥2, and (ii) establish relay communication paths between said communication terminal and the partner communication terminal via the selected relay devices, respectively, said communication state monitor unit is configured to instruct, based on the estimation results, said relay communication establishment unit to perform one of: (a) removal of a relay communication path from relay communication paths of the current set of the relay devices; (b) addition of a new relay communication path to the relay communication paths; and (c) both the removal and the addition, said relay communication establishment unit is configured to perform processing according to the instruction, when said relay communication establishment unit receives the instruction from said communication state monitor unit, and said communication state monitor unit is configured, when said relay communication establishment unit establishes the new relay communication path to the partner communication terminal via the new relay device, to (i) transmit predetermined estimation data to the new relay communication path in order to estimate the new relay communication path, (ii) estimate a communication state of communication on the new relay communication path, and (iii) cause, when a result of the estimation satisfies a predetermined condition, said communication unit to use the new relay communication path for transmission of the communication data provided from a higher application layer in said communication terminal.

2. The communication terminal according to claim 1, wherein said communication unit includes:
a data transmission unit configured to (i) divide the communication data into the pieces of divided data, and (ii) transmit the pieces of divided data via the relay devices selected by said relay communication establishment unit, respectively; and
a data receiving unit configured to (i) receive other pieces of divided data, which being generated by dividing other communication data in the partner communication terminal, from the partner communication terminal via the relay devices selected by said relay communication establishment unit, respectively, and (ii) reconstruct the other communication data from the received other pieces of divided data, and
said relay communication establishment unit is configured to transmit, to the partner communication terminal, a connection request message including address information of the new relay device of the new relay communication path to be added, when said communication state monitor unit instructs said relay communication establishment unit to add the new relay communication path.

3. The communication terminal according to claim 1, wherein said communication state monitor unit is configured to (i) monitor a transmission delay of each of the relay communication paths to the partner communication terminal, (ii) detect a relay communication path having a transmission delay that does not satisfy predetermined allowable condition, and (iii) instruct, when the detection is made, said relay communication establishment unit to perform one of: (a) removal of the detected relay communication path; (b) establishment of a new communication path to the partner communication terminal via a new relay device; and (c) both the removal and the establishment.

4. The communication terminal according to claim 1, wherein said communication state monitor unit is configured to (i) monitor a packet loss on each of the relay communication paths to the partner communication terminal, (ii) detect a relay communication path having a packet loss that does not satisfy predetermined allowable condition, and (iii) instruct, when the detection is made, said relay communication establishment unit to perform one of: (a) removal of the detected relay communication path; (b) establishment of a new communication path to the partner communication terminal via a new relay device; and (c) both the removal and the establishment.

5. The communication terminal according to claim 1, wherein said communication state monitor unit is configured to instruct, based on a traffic amount of the communication data, said relay communication establishment unit to perform one of: (a) removal of a relay communication path from the relay communication paths established by said relay communication establishment unit; and (b) establishment of a new communication path to the partner communication terminal via a new relay device.

6. The communication terminal according to claim 1, wherein said communication state monitor unit is configured to detect that the partner communication terminal has not been received a part of the pieces of divided data transmitted from said communication unit to the partner communication terminal via the relay devices, and
said communication unit is configured, when said communication state monitor unit made the detection, to retransmit the part of the pieces of divided data to the partner communication terminal on a different relay communication path via a relay device different from a relay device that has been used by said communication unit to transmit the part.

7. The communication terminal according to claim 6, wherein said communication unit is configured in the retransmission to (i) select a relay device having a transmission delay smaller than a transmission delay of a predetermined relay device in the communication to the partner communication terminal via the relay devices, and (ii) perform the retransmission on a relay communication path via the selected relay device.

8. The communication terminal according to claim 1, wherein said communication unit is configured to:
(i) store, for each of pieces of communication data provided from a higher application layer in said communication terminal, a correspondence relationship between (a) a corresponding one of the pieces of communication data and (b) relay communication paths on which communication for pieces of divided data is performed, the pieces of divided data being generated by dividing the corresponding one of the pieces of communication data; and
(ii) when the higher application layer notifies said communication unit with completion of the communication or the partner communication terminal notifies said communication unit with end of the communication, release all of the relay communication paths indicated by the correspondence relationship as corresponding to the corresponding one of the pieces of communication data.

9. The communication terminal according to claim 1, wherein said relay communication establishment unit is configured to (i) store pieces of category information each of which indicates a category of a corresponding one of the predetermined N relay devices, and (ii) select, based on the stored pieces of category information, the relay devices from among the N relay devices, the relay devices including at least one relay device belonging to a predetermined category in the pieces of category information, and
said communication unit is configured to (i) encrypt the pieces of divided data which are to be transmitted via relay devices not belonging to the predetermined category among the relay devices selected by said relay communication establishment unit, (ii) transmit the encrypted pieces of divided data via the relay devices not belonging to the predetermined category, and (iii) transmit information required to decrypt the encrypted pieces of divided data via the relay device belonging to the predetermined category among the relay devices selected by said relay communication establishment unit.

10. The communication terminal according to claim 1, wherein said communication unit is configured to (i) generate redundant data from the pieces of divided data to be transmitted on relay communication paths via the relay devices, so that the pieces of divided data are reconstructed from (a) a part of the pieces of divided data and the redundant data or (b) the redundant data only, and (ii) transmit the generated redundant data to the partner communication terminal on a relay communication path different from the relay communication paths on which the pieces of divided data are transmitted.

11. The communication terminal according to claim 1, wherein, when said communication state monitor unit is configured to instruct said relay communication establishment unit to add the new relay communication path, said relay communication establishment unit is configured to transmit the connection request message to the partner communication terminal via a relay device for which a relay communication path has been established among the relay devices except the new relay device of the new relay communication path.

12. The communication terminal according to claim 1, further comprising:
a Network Address Translation (NAT) establishment unit configured to perform NAT setting for a router of the local network including said communication terminal; and
a relay communication server unit connected from at least two other communication terminals, said relay communication server unit being configured to relay the communication for the pieces of divided data between the other communication devices.

13. The communication terminal according to claim 1, wherein the partner communication terminal includes a relay communication establishment unit configured to (i) select the relay devices from predetermined N relay devices, where N≥2, and (ii) establish relay communication paths between said communication terminal and the partner communication terminal via the selected relay devices, respectively,
said communication state monitor unit in said communication terminal is configured to instruct, based on the estimation results, said relay communication establishment unit in the partner communication terminal to perform one of: (a) removal of a relay communication path from the relay communication paths of the current set of the relay devices; (b) addition of a new relay communication path to the relay communication paths; and (c) both the removal and the addition, and
said relay communication establishment unit in the partner communication terminal is configured to perform processing according to the instruction, when said relay communication establishment unit receives the instruction from said communication state monitor unit in said communication terminal.

14. A method performed by a communication terminal connected to a local network to communicate with a partner communication terminal via relay devices each assigned with an address on a global network, said method comprising:
establishing, using a relay communication establishment unit, communication paths by transmitting a packet to an address of each of the relay devices, so that each of the relay devices transmits another packet on a corresponding one of the communication paths to a source address of the packet transmitted from the communication terminal so as to transmit the another packet to the communication terminal;
performing, using a communication unit, communication for pieces of divided data via the relay devices, the pieces of divided data being generated by dividing communication data into the pieces; and
(i) monitoring, for each of the relay devices, a communication state of the communication of a corresponding piece of the pieces of divided data transmitted via the corresponding relay device, and (ii) changing a current set of the relay devices to a new set of relay devices at least one of which is not included in the current set so as to be used for the communication, based on estimation results of estimating the monitored communication state for the each of the relay devices,
wherein said establishing comprises (i) selecting the relay devices from predetermined N relay devices, where N≥2, and (ii) establishing relay communication paths between the communication terminal and the partner communication terminal via the selected relay devices, respectively,
said monitoring comprises instructing, based on the estimation results, the relay communication establishment unit to perform one of: (a) removal of a relay communication path from relay communication paths of the current set of the relay devices; (b) addition of a new relay communication path to the relay communication paths; and (c) both the removal and the addition,
said establishing further comprises performing processing according to the instruction, when the relay communication establishment unit receives the instruction, and
said monitoring further comprises, when the relay communication establishment unit establishes the new relay communication path to the partner communication terminal via the new relay device, (i) transmitting predetermined estimation data to the new relay communication path in order to estimate the new relay communication path, (ii) estimating a communication state of communication on the new relay communication path, and (iii) causing, when a result of the estimation satisfies a predetermined condition, the communication unit to use the new relay communication path for transmission of the communication data provided from a higher application layer in the communication terminal.

15. A non-transitory computer-readable recording medium for use in a computer, the recording medium having a computer program recorded thereon for causing a communication terminal connected to a local network to communicate with a partner communication terminal via relay devices each assigned with an address on a global network, the computer program causing a computer to execute:
establishing, using a relay communication establishment unit, communication paths by transmitting a packet to an address of each of the relay devices, so that each of the relay devices transmits another packet on a corresponding one of the communication paths to a source address of the packet transmitted from the communication terminal so as to transmit the another packet to the communication terminal;
performing, using a communication unit, communication for pieces of divided data via the relay devices, the pieces of divided data being generated by dividing communication data into the pieces; and
(i) monitoring, for each of the relay devices, a communication state of the communication of a corresponding piece of the pieces of divided data transmitted via the corresponding relay device, and (ii) changing a current set of the relay devices to a new set of relay devices at least one of which is not included in the current set so as to be used for the communication, based on estimation results of estimating the monitored communication state for the each of the relay devices,
wherein said establishing comprises (i) selecting the relay devices from predetermined N relay devices, where N≥2, and (ii) establishing relay communication paths between the communication terminal and the partner communication terminal via the selected relay devices, respectively, said monitoring comprises instructing, based on the estimation results, the relay communication establishment unit to perform one of: (a) removal of a relay communication path from relay communication paths of the current set of the relay devices; (b) addition of a new relay communication path to the relay communication paths; and (c) both the removal and the addition, said establishing further comprises performing processing according to the instruction, when the relay communication establishment unit receives the instruction, and said monitoring further comprises, when the relay communication establishment unit establishes the new relay communication path to the partner communication terminal via the new relay device, (i) transmitting predetermined estimation data to the new relay communication path in order to estimate the new relay communication path, (ii) estimating a communication state of communication on the new relay communication path, and (iii) causing, when a result of the estimation satisfies a predetermined condition, the communication unit to use the new relay communication path for transmission of the communication data provided from a higher application layer in the communication terminal.

* * * * *